(12) United States Patent
Garcia-Luna-Aceves

(10) Patent No.: US 10,237,189 B2
(45) Date of Patent: Mar. 19, 2019

(54) SYSTEM AND METHOD FOR DISTANCE-BASED INTEREST FORWARDING

(71) Applicant: CISCO TECHNOLOGY, INC., San Jose, CA (US)

(72) Inventor: Jose J. Garcia-Luna-Aceves, San Mateo, CA (US)

(73) Assignee: Cisco Technology, Inc., San Jose, CA (US)

( * ) Notice: Subject to any disclaimer, the term of this patent is extended or adjusted under 35 U.S.C. 154(b) by 464 days.

(21) Appl. No.: 14/572,608

(22) Filed: Dec. 16, 2014

(65) Prior Publication Data

US 2016/0173386 A1 Jun. 16, 2016

(51) Int. Cl.
*G06F 15/16* (2006.01)
*H04L 12/801* (2013.01)
*H04L 12/733* (2013.01)
*H04L 12/705* (2013.01)
*H04L 29/08* (2006.01)
*H04L 12/715* (2013.01)
*H04L 12/725* (2013.01)

(52) U.S. Cl.
CPC .......... *H04L 47/17* (2013.01); *H04L 45/122* (2013.01); *H04L 45/18* (2013.01); *H04L 45/20* (2013.01); *H04L 45/306* (2013.01); *H04L 45/64* (2013.01); *H04L 67/1014* (2013.01)

(58) Field of Classification Search
CPC ................................ H04L 45/02; H04L 45/44
USPC ........................................................ 709/238
See application file for complete search history.

(56) References Cited

U.S. PATENT DOCUMENTS

| 817,441 | A | 4/1906 | Niesz |
| 4,309,569 | A | 1/1982 | Merkle |
| 4,921,898 | A | 5/1990 | Lenney |
| 5,070,134 | A | 12/1991 | Oyamada |
| 5,110,856 | A | 5/1992 | Oyamada |
| 5,214,702 | A | 5/1993 | Fischer |
| 5,377,354 | A | 12/1994 | Scannell |

(Continued)

FOREIGN PATENT DOCUMENTS

| CN | 103873371 | | 6/2014 |
| DE | 1720277 | A1 | 6/1967 |

(Continued)

OTHER PUBLICATIONS

Xie et al. "Collaborative Forwarding and Caching in Content Centric Networks", Networking 2012.

(Continued)

*Primary Examiner* — Kevin T Bates
*Assistant Examiner* — Emad Siddiqi

(57) ABSTRACT

One embodiment of the present invention provides a system for correctly processing an interest in a content-centric network (CCN). During operation, a first node in the CCN receives an interest for a piece of content from a second node. The interest indicates a name of the piece of content and a hop count from the second node to a destination node advertising the piece of content. The system determines, based on forwarding information and information associated with pending interests stored on the first node, whether a distance-based forwarding condition is met; and in response to the distance-based forwarding condition being met, accepts the interest.

18 Claims, 13 Drawing Sheets

(56) References Cited

U.S. PATENT DOCUMENTS

| | | |
|---|---|---|
| 5,506,844 A | 4/1996 | Rao |
| 5,629,370 A | 5/1997 | Freidzon |
| 5,845,207 A | 12/1998 | Amin |
| 5,870,605 A | 2/1999 | Bracho |
| 6,047,331 A | 4/2000 | Medard |
| 6,052,683 A | 4/2000 | Irwin |
| 6,085,320 A | 7/2000 | Kaliski, Jr. |
| 6,091,724 A | 7/2000 | Chandra |
| 6,128,623 A | 10/2000 | Mattis |
| 6,128,627 A | 10/2000 | Mattis |
| 6,173,364 B1 | 1/2001 | Zenchelsky |
| 6,209,003 B1 | 3/2001 | Mattis |
| 6,226,618 B1 | 5/2001 | Downs |
| 6,233,617 B1 | 5/2001 | Rothwein |
| 6,233,646 B1 | 5/2001 | Hahm |
| 6,289,358 B1 | 9/2001 | Mattis |
| 6,292,880 B1 | 9/2001 | Mattis |
| 6,332,158 B1 | 12/2001 | Risley |
| 6,363,067 B1 | 3/2002 | Chung |
| 6,366,988 B1 | 4/2002 | Skiba |
| 6,574,377 B1 | 6/2003 | Cahill |
| 6,654,792 B1 | 11/2003 | Verma |
| 6,667,957 B1 | 12/2003 | Corson |
| 6,681,220 B1 | 1/2004 | Kaplan |
| 6,681,326 B2 | 1/2004 | Son |
| 6,732,273 B1 | 5/2004 | Byers |
| 6,769,066 B1 | 7/2004 | Botros |
| 6,772,333 B1 | 8/2004 | Brendel |
| 6,775,258 B1 | 8/2004 | vanValkenburg |
| 6,862,280 B1 | 3/2005 | Bertagna |
| 6,901,452 B1 | 5/2005 | Bertagna |
| 6,915,307 B1 | 7/2005 | Mattis |
| 6,917,985 B2 | 7/2005 | Madruga |
| 6,957,228 B1 | 10/2005 | Graser |
| 6,968,393 B1 | 11/2005 | Chen |
| 6,981,029 B1 | 12/2005 | Menditto |
| 7,007,024 B2 | 2/2006 | Zelenka |
| 7,013,389 B1 | 3/2006 | Srivastava |
| 7,031,308 B2 | 4/2006 | Garcia-Luna-Aceves |
| 7,043,637 B2 | 5/2006 | Bolosky |
| 7,061,877 B1 | 6/2006 | Gummalla |
| 7,080,073 B1 | 7/2006 | Jiang |
| RE39,360 E | 10/2006 | Aziz |
| 7,149,750 B2 | 12/2006 | Chadwick |
| 7,152,094 B1 | 12/2006 | Jannu |
| 7,177,646 B2 | 2/2007 | ONeill |
| 7,206,860 B2 | 4/2007 | Murakami |
| 7,206,861 B1 | 4/2007 | Callon |
| 7,210,326 B2 | 5/2007 | Kawamoto |
| 7,246,159 B2 | 7/2007 | Aggarwal |
| 7,257,837 B2 | 8/2007 | Xu |
| 7,287,275 B2 | 10/2007 | Moskowitz |
| 7,315,541 B1 | 1/2008 | Housel |
| 7,339,929 B2 | 3/2008 | Zelig |
| 7,350,229 B1 | 3/2008 | Lander |
| 7,362,727 B1 | 4/2008 | ONeill |
| 7,382,787 B1 | 6/2008 | Barnes |
| 7,395,507 B2 | 7/2008 | Robarts |
| 7,430,755 B1 | 9/2008 | Hughes |
| 7,444,251 B2 | 10/2008 | Nikovski |
| 7,466,703 B1 | 12/2008 | Arunachalam |
| 7,472,422 B1 | 12/2008 | Agbabian |
| 7,496,668 B2 | 2/2009 | Hawkinson |
| 7,509,425 B1 | 3/2009 | Rosenberg |
| 7,523,016 B1 | 4/2009 | Surdulescu |
| 7,542,471 B2 | 6/2009 | Samuels |
| 7,543,064 B2 | 6/2009 | Juncker |
| 7,552,233 B2 | 6/2009 | Raju |
| 7,555,482 B2 | 6/2009 | Korkus |
| 7,555,563 B2 | 6/2009 | Ott |
| 7,564,812 B1 | 7/2009 | Elliott |
| 7,567,547 B2 | 7/2009 | Mosko |
| 7,567,946 B2 | 7/2009 | Andreoli |
| 7,580,971 B1 | 8/2009 | Gollapudi |
| 7,623,535 B2 | 11/2009 | Guichard |
| 7,636,767 B2 | 12/2009 | Lev-Ran |
| 7,647,507 B1 | 1/2010 | Feng |
| 7,660,324 B2 | 2/2010 | Oguchi |
| 7,685,290 B2 | 3/2010 | Satapati |
| 7,698,463 B2 | 4/2010 | Ogier |
| 7,698,559 B1 | 4/2010 | Chaudhury |
| 7,769,887 B1 | 8/2010 | Bhattacharyya |
| 7,779,467 B2 | 8/2010 | Choi |
| 7,801,069 B2 | 9/2010 | Cheung |
| 7,801,177 B2 | 9/2010 | Luss |
| 7,816,441 B2 | 10/2010 | Elizalde |
| 7,831,733 B2 | 11/2010 | Sultan |
| 7,873,619 B1 | 1/2011 | Faibish |
| 7,908,337 B2 | 3/2011 | Garcia-Luna-Aceves |
| 7,924,837 B1 | 4/2011 | Shabtay |
| 7,953,014 B2 | 5/2011 | Toda |
| 7,953,885 B1 | 5/2011 | Devireddy |
| 7,979,912 B1 | 7/2011 | Roka |
| 8,000,267 B2 | 8/2011 | Solis |
| 8,010,691 B2 | 8/2011 | Kollmansberger |
| 8,069,023 B1 | 11/2011 | Frailong |
| 8,074,289 B1 | 12/2011 | Carpentier |
| 8,117,441 B2 | 2/2012 | Kurien |
| 8,160,069 B2 | 4/2012 | Jacobson |
| 8,204,060 B2 | 6/2012 | Jacobson |
| 8,214,364 B2 | 7/2012 | Bigus |
| 8,224,985 B2 | 7/2012 | Takeda |
| 8,225,057 B1 | 7/2012 | Zheng |
| 8,271,578 B2 | 9/2012 | Sheffi |
| 8,271,687 B2 | 9/2012 | Turner |
| 8,312,064 B1 | 11/2012 | Gauvin |
| 8,332,357 B1 | 12/2012 | Chung |
| 8,386,622 B2 | 2/2013 | Jacobson |
| 8,447,851 B1 | 5/2013 | Anderson |
| 8,462,781 B2 | 6/2013 | McGhee |
| 8,467,297 B2 | 6/2013 | Liu |
| 8,473,633 B2 | 6/2013 | Eardley |
| 8,553,562 B2 | 10/2013 | Allan |
| 8,572,214 B2 | 10/2013 | Garcia-Luna-Aceves |
| 8,654,649 B2 | 2/2014 | Vasseur |
| 8,665,757 B2 | 3/2014 | Kling |
| 8,667,172 B2 | 3/2014 | Ravindran |
| 8,677,451 B1 | 3/2014 | Bhimaraju |
| 8,688,619 B1 | 4/2014 | Ezick |
| 8,699,350 B1 | 4/2014 | Kumar |
| 8,718,055 B2 | 5/2014 | Vasseur |
| 8,750,820 B2 | 6/2014 | Allan |
| 8,761,022 B2 | 6/2014 | Chiabaut |
| 8,762,477 B2 | 6/2014 | Xie |
| 8,762,570 B2 | 6/2014 | Qian |
| 8,762,707 B2 | 6/2014 | Killian |
| 8,767,627 B2 | 7/2014 | Ezure |
| 8,817,594 B2 | 8/2014 | Gero |
| 8,826,381 B2 | 9/2014 | Kim |
| 8,832,302 B1 | 9/2014 | Bradford |
| 8,836,536 B2 | 9/2014 | Marwah |
| 8,861,356 B2 | 10/2014 | Kozat |
| 8,862,774 B2 | 10/2014 | Vasseur |
| 8,868,779 B2 | 10/2014 | ONeill |
| 8,874,842 B1 | 10/2014 | Kimmel |
| 8,880,682 B2 | 11/2014 | Bishop |
| 8,903,756 B2 | 12/2014 | Zhao |
| 8,923,293 B2 | 12/2014 | Jacobson |
| 8,934,496 B2 | 1/2015 | Vasseur |
| 8,937,865 B1 | 1/2015 | Kumar |
| 8,972,969 B2 | 3/2015 | Gaither |
| 8,977,596 B2 | 3/2015 | Montulli |
| 9,002,921 B2 | 4/2015 | Westphal |
| 9,032,095 B1 | 5/2015 | Traina |
| 9,071,498 B2 | 6/2015 | Beser |
| 9,112,895 B1 | 8/2015 | Lin |
| 9,137,152 B2 | 9/2015 | Xie |
| 9,253,087 B2 | 2/2016 | Zhang |
| 9,270,598 B1 * | 2/2016 | Oran ............... H04L 67/327 |
| 9,280,610 B2 | 3/2016 | Gruber |
| 2002/0002680 A1 | 1/2002 | Carbajal |
| 2002/0010795 A1 | 1/2002 | Brown |
| 2002/0038296 A1 | 3/2002 | Margolus |
| 2002/0048269 A1 | 4/2002 | Hong |

(56) References Cited

U.S. PATENT DOCUMENTS

| | | |
|---|---|---|
| 2002/0054593 A1 | 5/2002 | Morohashi |
| 2002/0077988 A1 | 6/2002 | Sasaki |
| 2002/0078066 A1 | 6/2002 | Robinson |
| 2002/0138551 A1 | 9/2002 | Erickson |
| 2002/0152305 A1 | 10/2002 | Jackson |
| 2002/0176404 A1 | 11/2002 | Girard |
| 2002/0188605 A1 | 12/2002 | Adya |
| 2002/0199014 A1 | 12/2002 | Yang |
| 2003/0004621 A1 | 1/2003 | Bousquet |
| 2003/0009365 A1 | 1/2003 | Tynan |
| 2003/0033394 A1 | 2/2003 | Stine |
| 2003/0046396 A1 | 3/2003 | Richter |
| 2003/0046421 A1 | 3/2003 | Horvitz et al. |
| 2003/0046437 A1 | 3/2003 | Eytchison |
| 2003/0048793 A1 | 3/2003 | Pochon |
| 2003/0051100 A1 | 3/2003 | Patel |
| 2003/0061384 A1 | 3/2003 | Nakatani |
| 2003/0074472 A1 | 4/2003 | Lucco |
| 2003/0088696 A1 | 5/2003 | McCanne |
| 2003/0097447 A1 | 5/2003 | Johnston |
| 2003/0099237 A1 | 5/2003 | Mitra |
| 2003/0140257 A1 | 7/2003 | Paterka |
| 2003/0210694 A1 | 11/2003 | Jayaraman et al. |
| 2003/0229892 A1 | 12/2003 | Sardera |
| 2004/0024879 A1 | 2/2004 | Dingman |
| 2004/0030602 A1 | 2/2004 | Rosenquist |
| 2004/0064737 A1 | 4/2004 | Milliken |
| 2004/0071140 A1 | 4/2004 | Jason |
| 2004/0073617 A1 | 4/2004 | Milliken |
| 2004/0073715 A1 | 4/2004 | Folkes |
| 2004/0139230 A1 | 7/2004 | Kim |
| 2004/0196783 A1 | 10/2004 | Shinomiya |
| 2004/0218548 A1 | 11/2004 | Kennedy |
| 2004/0221047 A1 | 11/2004 | Grover |
| 2004/0225627 A1 | 11/2004 | Botros |
| 2004/0233916 A1 | 11/2004 | Takeuchi |
| 2004/0246902 A1 | 12/2004 | Weinstein |
| 2004/0252683 A1 | 12/2004 | Kennedy |
| 2005/0003832 A1 | 1/2005 | Osafune |
| 2005/0028156 A1 | 2/2005 | Hammond |
| 2005/0043060 A1 | 2/2005 | Brandenberg |
| 2005/0050211 A1 | 3/2005 | Kaul |
| 2005/0074001 A1 | 4/2005 | Mattes |
| 2005/0132207 A1 | 6/2005 | Mourad |
| 2005/0149508 A1 | 7/2005 | Deshpande |
| 2005/0159111 A1* | 7/2005 | Kim ............... H04L 45/00 455/67.14 |
| 2005/0159823 A1 | 7/2005 | Hayes |
| 2005/0198351 A1 | 9/2005 | Nog |
| 2005/0249196 A1 | 11/2005 | Ansari |
| 2005/0259637 A1 | 11/2005 | Chu |
| 2005/0262217 A1 | 11/2005 | Nonaka |
| 2005/0281288 A1 | 12/2005 | Banerjee |
| 2005/0286535 A1 | 12/2005 | Shrum |
| 2005/0289222 A1 | 12/2005 | Sahim |
| 2006/0010249 A1 | 1/2006 | Sabesan |
| 2006/0029102 A1 | 2/2006 | Abe |
| 2006/0039379 A1 | 2/2006 | Abe |
| 2006/0051055 A1 | 3/2006 | Ohkawa |
| 2006/0072523 A1 | 4/2006 | Richardson |
| 2006/0099973 A1 | 5/2006 | Nair |
| 2006/0129514 A1 | 6/2006 | Watanabe |
| 2006/0133343 A1 | 6/2006 | Huang |
| 2006/0146686 A1 | 7/2006 | Kim |
| 2006/0173831 A1 | 8/2006 | Basso |
| 2006/0193295 A1 | 8/2006 | White |
| 2006/0203804 A1 | 9/2006 | Whitmore |
| 2006/0206445 A1 | 9/2006 | Andreoli |
| 2006/0215684 A1 | 9/2006 | Capone |
| 2006/0223504 A1 | 10/2006 | Ishak |
| 2006/0242155 A1 | 10/2006 | Moore |
| 2006/0256767 A1 | 11/2006 | Suzuki |
| 2006/0268792 A1 | 11/2006 | Belcea |
| 2007/0019619 A1 | 1/2007 | Foster |
| 2007/0073888 A1 | 3/2007 | Madhok |
| 2007/0094265 A1 | 4/2007 | Korkus |
| 2007/0112880 A1 | 5/2007 | Yang |
| 2007/0124412 A1 | 5/2007 | Narayanaswami |
| 2007/0127457 A1 | 6/2007 | Mirtorabi |
| 2007/0160062 A1 | 7/2007 | Morishita |
| 2007/0162394 A1 | 7/2007 | Zager |
| 2007/0171828 A1 | 7/2007 | Dalal |
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |
| 2007/0239892 A1 | 10/2007 | Ott |
| 2007/0240207 A1 | 10/2007 | Belakhdar |
| 2007/0245034 A1 | 10/2007 | Retana |
| 2007/0253418 A1 | 11/2007 | Shiri |
| 2007/0255677 A1 | 11/2007 | Alexander |
| 2007/0255699 A1 | 11/2007 | Sreenivas |
| 2007/0255781 A1 | 11/2007 | Li |
| 2007/0274504 A1 | 11/2007 | Maes |
| 2007/0275701 A1 | 11/2007 | Jonker |
| 2007/0276907 A1 | 11/2007 | Maes |
| 2007/0283158 A1 | 12/2007 | Danseglio |
| 2007/0294187 A1 | 12/2007 | Scherrer |
| 2008/0002640 A1* | 1/2008 | Westphal ............... H04W 40/02 370/338 |
| 2008/0005056 A1 | 1/2008 | Stelzig |
| 2008/0005223 A1 | 1/2008 | Flake |
| 2008/0010366 A1 | 1/2008 | Duggan |
| 2008/0037420 A1 | 2/2008 | Tang |
| 2008/0043989 A1 | 2/2008 | Furutono |
| 2008/0046340 A1 | 2/2008 | Brown |
| 2008/0059631 A1 | 3/2008 | Bergstrom |
| 2008/0080440 A1 | 4/2008 | Yarvis |
| 2008/0082662 A1 | 4/2008 | Dandliker |
| 2008/0095159 A1 | 4/2008 | Suzuki |
| 2008/0101357 A1 | 5/2008 | Iovanna |
| 2008/0107034 A1 | 5/2008 | Jetcheva |
| 2008/0107259 A1 | 5/2008 | Satou |
| 2008/0123862 A1 | 5/2008 | Rowley |
| 2008/0133583 A1 | 6/2008 | Artan |
| 2008/0133755 A1 | 6/2008 | Pollack |
| 2008/0151755 A1 | 6/2008 | Nishioka |
| 2008/0159271 A1 | 7/2008 | Kutt |
| 2008/0165775 A1 | 7/2008 | Das |
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0216086 A1 | 9/2008 | Tanaka |
| 2008/0243992 A1 | 10/2008 | Jardetzky |
| 2008/0250006 A1 | 10/2008 | Dettinger |
| 2008/0256138 A1 | 10/2008 | Sim-Tang |
| 2008/0256359 A1 | 10/2008 | Kahn |
| 2008/0270618 A1 | 10/2008 | Rosenberg |
| 2008/0271143 A1 | 10/2008 | Stephens |
| 2008/0287142 A1 | 11/2008 | Keighran |
| 2008/0288580 A1 | 11/2008 | Wang |
| 2008/0291923 A1 | 11/2008 | Back |
| 2008/0298376 A1 | 12/2008 | Takeda |
| 2008/0320148 A1 | 12/2008 | Capuozzo |
| 2009/0006659 A1 | 1/2009 | Collins |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |
| 2009/0052660 A1 | 2/2009 | Chen |
| 2009/0067429 A1 | 3/2009 | Nagai |
| 2009/0077184 A1 | 3/2009 | Brewer |
| 2009/0092043 A1 | 4/2009 | Lapuh |
| 2009/0097631 A1 | 4/2009 | Gisby |
| 2009/0103515 A1 | 4/2009 | Pointer |
| 2009/0113068 A1 | 4/2009 | Fujihira |
| 2009/0116393 A1 | 5/2009 | Hughes |
| 2009/0117922 A1 | 5/2009 | Bell |
| 2009/0132662 A1 | 5/2009 | Sheridan |
| 2009/0135728 A1 | 5/2009 | Shen |
| 2009/0144300 A1 | 6/2009 | Chatley |
| 2009/0157887 A1 | 6/2009 | Froment |
| 2009/0185745 A1 | 7/2009 | Momosaki |

(56) References Cited

U.S. PATENT DOCUMENTS

| | | |
|---|---|---|
| 2009/0193101 A1 | 7/2009 | Munetsugu |
| 2009/0198832 A1 | 8/2009 | Shah |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |
| 2009/0274158 A1 | 11/2009 | Sharp |
| 2009/0276396 A1 | 11/2009 | Gorman |
| 2009/0285209 A1 | 11/2009 | Stewart |
| 2009/0287835 A1 | 11/2009 | Jacobson |
| 2009/0287853 A1 | 11/2009 | Carson |
| 2009/0288076 A1 | 11/2009 | Johnson |
| 2009/0288143 A1 | 11/2009 | Stebila |
| 2009/0288163 A1 | 11/2009 | Jacobson |
| 2009/0292743 A1 | 11/2009 | Bigus |
| 2009/0293121 A1 | 11/2009 | Bigus |
| 2009/0296719 A1 | 12/2009 | Maier |
| 2009/0300079 A1 | 12/2009 | Shitomi |
| 2009/0300407 A1 | 12/2009 | Kamath |
| 2009/0300512 A1 | 12/2009 | Ahn |
| 2009/0307333 A1 | 12/2009 | Welingkar |
| 2009/0323632 A1 | 12/2009 | Nix |
| 2010/0005061 A1 | 1/2010 | Basco |
| 2010/0027539 A1 | 2/2010 | Beverly |
| 2010/0046546 A1 | 2/2010 | Ram |
| 2010/0054183 A1* | 3/2010 | Shin ............ H04L 45/02 370/328 |
| 2010/0057929 A1 | 3/2010 | Merat |
| 2010/0058346 A1 | 3/2010 | Narang |
| 2010/0088370 A1 | 4/2010 | Wu |
| 2010/0094767 A1 | 4/2010 | Miltonberger |
| 2010/0094876 A1 | 4/2010 | Huang |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1 | 8/2010 | Jacobson |
| 2010/0195654 A1 | 8/2010 | Jacobson |
| 2010/0195655 A1* | 8/2010 | Jacobson ............ H04L 45/748 370/392 |
| 2010/0217874 A1 | 8/2010 | Anantharaman |
| 2010/0217985 A1 | 8/2010 | Fahrny |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Redlich |
| 2010/0250939 A1 | 9/2010 | Adams |
| 2010/0257149 A1 | 10/2010 | Cognigni |
| 2010/0268782 A1 | 10/2010 | Zombek |
| 2010/0272107 A1 | 10/2010 | Papp |
| 2010/0281263 A1 | 11/2010 | Ugawa |
| 2010/0284309 A1 | 11/2010 | Allan |
| 2010/0284404 A1 | 11/2010 | Gopinath |
| 2010/0293293 A1 | 11/2010 | Beser |
| 2010/0322249 A1 | 12/2010 | Thathapudi |
| 2011/0013637 A1 | 1/2011 | Xue |
| 2011/0019674 A1 | 1/2011 | Iovanna |
| 2011/0022812 A1 | 1/2011 | vanderLinden |
| 2011/0029952 A1 | 2/2011 | Harrington |
| 2011/0055392 A1 | 3/2011 | Shen |
| 2011/0055921 A1 | 3/2011 | Narayanaswamy |
| 2011/0060716 A1 | 3/2011 | Forman |
| 2011/0060717 A1 | 3/2011 | Forman |
| 2011/0090908 A1 | 4/2011 | Jacobson |
| 2011/0106755 A1 | 5/2011 | Hao |
| 2011/0131308 A1 | 6/2011 | Eriksson |
| 2011/0137919 A1 | 6/2011 | Ryu |
| 2011/0145597 A1 | 6/2011 | Yamaguchi |
| 2011/0145858 A1 | 6/2011 | Philpott |
| 2011/0149858 A1 | 6/2011 | Hwang |
| 2011/0153840 A1 | 6/2011 | Narayana |
| 2011/0158122 A1 | 6/2011 | Murphy |
| 2011/0161408 A1 | 6/2011 | Kim |
| 2011/0202609 A1 | 8/2011 | Chaturvedi |
| 2011/0219093 A1 | 9/2011 | Ragunathan |
| 2011/0219427 A1 | 9/2011 | Hito |
| 2011/0219727 A1 | 9/2011 | May |
| 2011/0225293 A1 | 9/2011 | Rathod |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0265159 A1 | 10/2011 | Ronda |
| 2011/0265174 A1 | 10/2011 | Thornton |
| 2011/0271007 A1 | 11/2011 | Wang |
| 2011/0280214 A1 | 11/2011 | Lee |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2012/0011170 A1 | 1/2012 | Elad |
| 2012/0011551 A1 | 1/2012 | Levy |
| 2012/0023113 A1 | 1/2012 | Ferren |
| 2012/0036180 A1 | 2/2012 | Thornton |
| 2012/0045064 A1 | 2/2012 | Rembarz |
| 2012/0047361 A1 | 2/2012 | Erdmann |
| 2012/0066727 A1 | 3/2012 | Nozoe |
| 2012/0106339 A1 | 5/2012 | Mishra |
| 2012/0110159 A1 | 5/2012 | Richardson |
| 2012/0114313 A1 | 5/2012 | Phillips |
| 2012/0120803 A1 | 5/2012 | Farkas |
| 2012/0127994 A1 | 5/2012 | Ko |
| 2012/0134361 A1* | 5/2012 | Wong ............ H04L 45/021 370/392 |
| 2012/0136676 A1 | 5/2012 | Goodall |
| 2012/0136936 A1 | 5/2012 | Quintuna |
| 2012/0136945 A1 | 5/2012 | Lee |
| 2012/0137367 A1 | 5/2012 | Dupont |
| 2012/0141093 A1 | 6/2012 | Yamaguchi |
| 2012/0155464 A1 | 6/2012 | Kim |
| 2012/0158973 A1 | 6/2012 | Jacobson |
| 2012/0163373 A1 | 6/2012 | Lo |
| 2012/0166433 A1 | 6/2012 | Tseng |
| 2012/0170913 A1 | 7/2012 | Isozaki |
| 2012/0179653 A1 | 7/2012 | Araki |
| 2012/0197690 A1 | 8/2012 | Agulnek |
| 2012/0198048 A1 | 8/2012 | Ioffe |
| 2012/0221150 A1 | 8/2012 | Arensmeier |
| 2012/0224487 A1 | 9/2012 | Hui |
| 2012/0226902 A1 | 9/2012 | Kim |
| 2012/0257500 A1 | 10/2012 | Lynch |
| 2012/0284791 A1 | 11/2012 | Miller |
| 2012/0290669 A1 | 11/2012 | Parks |
| 2012/0290919 A1 | 11/2012 | Melnyk |
| 2012/0291102 A1 | 11/2012 | Cohen |
| 2012/0300669 A1 | 11/2012 | Zahavi |
| 2012/0307629 A1 | 12/2012 | Vasseur |
| 2012/0314580 A1 | 12/2012 | Hong |
| 2012/0317307 A1 | 12/2012 | Ravindran |
| 2012/0322422 A1 | 12/2012 | Frecks |
| 2012/0323933 A1 | 12/2012 | He |
| 2012/0331112 A1 | 12/2012 | Chatani |
| 2013/0024560 A1 | 1/2013 | Vasseur |
| 2013/0041982 A1 | 2/2013 | Shi |
| 2013/0051392 A1 | 2/2013 | Filsfils |
| 2013/0054971 A1 | 2/2013 | Yamaguchi |
| 2013/0060962 A1 | 3/2013 | Wang |
| 2013/0061084 A1 | 3/2013 | Barton |
| 2013/0066823 A1 | 3/2013 | Sweeney |
| 2013/0073552 A1 | 3/2013 | Rangwala |
| 2013/0073882 A1 | 3/2013 | Inbaraj |
| 2013/0074155 A1 | 3/2013 | Huh |
| 2013/0090942 A1 | 4/2013 | Robinson |
| 2013/0091539 A1 | 4/2013 | Khurana |

(56) References Cited

U.S. PATENT DOCUMENTS

| | | |
|---|---|---|
| 2013/0110987 A1 | 5/2013 | Kim |
| 2013/0111063 A1 | 5/2013 | Lee |
| 2013/0128786 A1 | 5/2013 | Sultan |
| 2013/0132719 A1 | 5/2013 | Kobayashi |
| 2013/0139245 A1 | 5/2013 | Thomas |
| 2013/0151584 A1 | 6/2013 | Westphal |
| 2013/0151646 A1 | 6/2013 | Chidambaram |
| 2013/0152070 A1 | 6/2013 | Bhullar |
| 2013/0163426 A1 | 6/2013 | Beliveau |
| 2013/0166668 A1 | 6/2013 | Byun |
| 2013/0173822 A1 | 7/2013 | Hong |
| 2013/0182568 A1 | 7/2013 | Lee |
| 2013/0182931 A1 | 7/2013 | Fan |
| 2013/0185406 A1 | 7/2013 | Choi |
| 2013/0191412 A1 | 7/2013 | Kitamura |
| 2013/0197698 A1 | 8/2013 | Shah |
| 2013/0198119 A1 | 8/2013 | Eberhardt, III |
| 2013/0212185 A1 | 8/2013 | Pasquero |
| 2013/0219038 A1 | 8/2013 | Lee |
| 2013/0219081 A1 | 8/2013 | Qian |
| 2013/0219478 A1 | 8/2013 | Mahamuni |
| 2013/0223237 A1 | 8/2013 | Hui |
| 2013/0227048 A1 | 8/2013 | Xie |
| 2013/0227114 A1 | 8/2013 | Vasseur |
| 2013/0227166 A1 | 8/2013 | Ravindran |
| 2013/0242996 A1* | 9/2013 | Varvello ............... H04L 67/327 370/392 |
| 2013/0250809 A1 | 9/2013 | Hui |
| 2013/0262365 A1 | 10/2013 | Dolbear |
| 2013/0262698 A1 | 10/2013 | Schwan |
| 2013/0282854 A1 | 10/2013 | Jang |
| 2013/0282860 A1* | 10/2013 | Zhang ................... H04L 45/306 709/217 |
| 2013/0282920 A1 | 10/2013 | Zhang |
| 2013/0304758 A1 | 11/2013 | Gruber |
| 2013/0304937 A1 | 11/2013 | Lee |
| 2013/0325888 A1 | 12/2013 | Oneppo |
| 2013/0329696 A1 | 12/2013 | Xu |
| 2013/0332971 A1 | 12/2013 | Fisher |
| 2013/0336103 A1 | 12/2013 | Vasseur |
| 2013/0336323 A1 | 12/2013 | Srinivasan |
| 2013/0339481 A1 | 12/2013 | Hong |
| 2013/0343408 A1 | 12/2013 | Cook |
| 2014/0003232 A1 | 1/2014 | Guichard |
| 2014/0003424 A1 | 1/2014 | Matsuhira |
| 2014/0006354 A1 | 1/2014 | Parkison |
| 2014/0006565 A1 | 1/2014 | Muscariello |
| 2014/0029445 A1 | 1/2014 | Hui |
| 2014/0032714 A1 | 1/2014 | Liu |
| 2014/0033193 A1 | 1/2014 | Palaniappan |
| 2014/0040505 A1 | 2/2014 | Barton |
| 2014/0040628 A1 | 2/2014 | Fort |
| 2014/0043987 A1 | 2/2014 | Watve |
| 2014/0047513 A1 | 2/2014 | vantNoordende |
| 2014/0074730 A1 | 3/2014 | Arensmeier |
| 2014/0075567 A1 | 3/2014 | Raleigh |
| 2014/0082135 A1 | 3/2014 | Jung |
| 2014/0082661 A1 | 3/2014 | Krahnstoever |
| 2014/0089454 A1 | 3/2014 | Jeon |
| 2014/0096249 A1 | 4/2014 | Dupont |
| 2014/0098685 A1 | 4/2014 | Shattil |
| 2014/0108313 A1 | 4/2014 | Heidasch |
| 2014/0108474 A1 | 4/2014 | David |
| 2014/0115037 A1 | 4/2014 | Liu |
| 2014/0122587 A1 | 5/2014 | Petker et al. |
| 2014/0129736 A1 | 5/2014 | Yu |
| 2014/0136814 A1 | 5/2014 | Stark |
| 2014/0140348 A1 | 5/2014 | Perlman |
| 2014/0143370 A1 | 5/2014 | Vilenski |
| 2014/0146819 A1 | 5/2014 | Bae |
| 2014/0149733 A1 | 5/2014 | Kim |
| 2014/0237095 A1 | 5/2014 | Petker |
| 2014/0156396 A1 | 6/2014 | deKozan |
| 2014/0164552 A1* | 6/2014 | Kim ................... H04L 67/2842 709/214 |
| 2014/0165207 A1 | 6/2014 | Engel |
| 2014/0172783 A1 | 6/2014 | Suzuki |
| 2014/0172981 A1 | 6/2014 | Kim |
| 2014/0173034 A1 | 6/2014 | Liu |
| 2014/0173076 A1 | 6/2014 | Ravindran |
| 2014/0181140 A1 | 6/2014 | Kim |
| 2014/0192677 A1 | 7/2014 | Chew |
| 2014/0192717 A1* | 7/2014 | Liu ....................... H04W 60/00 370/328 |
| 2014/0195328 A1 | 7/2014 | Ferens |
| 2014/0195641 A1 | 7/2014 | Wang |
| 2014/0195666 A1 | 7/2014 | Dumitriu |
| 2014/0204945 A1 | 7/2014 | Byun |
| 2014/0214942 A1 | 7/2014 | Ozonat |
| 2014/0233575 A1* | 8/2014 | Xie ........................ H04L 45/44 370/400 |
| 2014/0237085 A1 | 8/2014 | Park |
| 2014/0245359 A1 | 8/2014 | DeFoy |
| 2014/0254595 A1 | 9/2014 | Luo |
| 2014/0280823 A1 | 9/2014 | Varvello |
| 2014/0281489 A1 | 9/2014 | Peterka |
| 2014/0281505 A1 | 9/2014 | Zhang |
| 2014/0282816 A1 | 9/2014 | Xie |
| 2014/0289325 A1 | 9/2014 | Solis |
| 2014/0289790 A1 | 9/2014 | Wilson |
| 2014/0298248 A1 | 10/2014 | Kang |
| 2014/0314093 A1 | 10/2014 | You |
| 2014/0337276 A1 | 11/2014 | Iordanov |
| 2014/0355448 A1* | 12/2014 | Kawano ................. H04L 45/64 370/236 |
| 2014/0365550 A1 | 12/2014 | Jang |
| 2015/0006896 A1 | 1/2015 | Franck |
| 2015/0018770 A1 | 1/2015 | Baran |
| 2015/0032892 A1 | 1/2015 | Narayanan |
| 2015/0033365 A1 | 1/2015 | Mellor |
| 2015/0039890 A1 | 2/2015 | Khosravi |
| 2015/0063802 A1 | 3/2015 | Bahadur |
| 2015/0089081 A1 | 3/2015 | Thubert |
| 2015/0095481 A1 | 4/2015 | Ohnishi |
| 2015/0095514 A1 | 4/2015 | Yu |
| 2015/0120663 A1 | 4/2015 | LeScouarnec |
| 2015/0169758 A1 | 6/2015 | Assom |
| 2015/0188770 A1 | 7/2015 | Naiksatam |
| 2015/0195149 A1 | 7/2015 | Vasseur |
| 2015/0207633 A1 | 7/2015 | Ravindran |
| 2015/0207864 A1 | 7/2015 | Wilson |
| 2015/0279348 A1 | 10/2015 | Cao |
| 2015/0288755 A1 | 10/2015 | Mosko |
| 2015/0312300 A1 | 10/2015 | Mosko |
| 2015/0349961 A1 | 12/2015 | Mosko |
| 2015/0372903 A1 | 12/2015 | Hui |
| 2015/0381546 A1 | 12/2015 | Mahadevan |
| 2016/0019275 A1 | 1/2016 | Mosko |
| 2016/0021172 A1 | 1/2016 | Mahadevan |
| 2016/0062840 A1 | 3/2016 | Scott |
| 2016/0065685 A1* | 3/2016 | Kurihara ................. H04L 1/08 714/748 |
| 2016/0110466 A1 | 4/2016 | Uzun |
| 2016/0171184 A1 | 6/2016 | Solis |

FOREIGN PATENT DOCUMENTS

| | | |
|---|---|---|
| DE | 19620817 A1 | 11/1997 |
| EP | 0295727 A2 | 12/1988 |
| EP | 0757065 A2 | 7/1996 |
| EP | 1077422 A2 | 2/2001 |
| EP | 1383265 A1 | 1/2004 |
| EP | 1384729 A1 | 1/2004 |
| EP | 1473889 A2 | 11/2004 |
| EP | 2120402 | 11/2009 |
| EP | 2120419 | 11/2009 |
| EP | 2120419 A2 | 11/2009 |
| EP | 2124415 A2 | 11/2009 |
| EP | 2214357 A1 | 8/2010 |
| EP | 2299754 A1 | 3/2011 |
| EP | 2323346 | 5/2011 |
| EP | 2552083 | 1/2013 |
| EP | 2214356 | 5/2016 |

(56) References Cited

FOREIGN PATENT DOCUMENTS

| WO | 03005288 | A2 | 1/2003 |
|---|---|---|---|
| WO | 03042254 | A1 | 5/2003 |
| WO | 03049369 | A2 | 6/2003 |
| WO | 03091297 | A1 | 11/2003 |
| WO | 2007113180 | A1 | 10/2007 |
| WO | 2007122620 | | 11/2007 |
| WO | 2007144388 | A1 | 12/2007 |
| WO | 2011049890 | A1 | 4/2011 |
| WO | 2012077073 | A1 | 6/2012 |
| WO | 2013123410 | | 8/2013 |
| WO | 2015084327 | | 6/2015 |

OTHER PUBLICATIONS

Jacobson, Van et al., "Content-Centric Networking, Whitepaper Describing Future Assurable Global Networks", Palo Alto Research Center, Inc., Jan. 30, 2007, pp. 1-9.

Koponen, Teemu et al., "A Data-Oriented (and Beyond) Network Architecture", SIGCOMM '07, Aug. 27-31, 2007, Kyoto, Japan, XP-002579021, p. 181-192.

Fall, K. et al., "DTN: an architectural retrospective", Selected areas in communications, IEEE Journal on, vol. 28, No. 5, Jun. 1, 2008, pp. 828-835.

"CCNx," http://ccnx.org/. downloaded Mar. 11, 2015.

"Content Delivery Network", Wikipedia, Dec. 10, 2011, http://en.wikipedia.org/w/index.php?title=Content_delivery_network&oldid=465077460.

"Digital Signature" archived on Aug. 31, 2009 at http://web.archive.org/web/20090831170721/http://en.wikipedia.org/wiki/Digital_signature.

"Introducing JSON," http://www.json.org/. downloaded Mar. 11, 2015.

"Microsoft PlayReady," http://www.microsoft.com/playready/. downloaded Mar. 11, 2015.

"Pursuing a pub/sub internet (PURSUIT)," http://www.fp7-pursuit.ew/PursuitWeb/. downloaded Mar. 11, 2015

"The FP7 4WARD project," http://www.4ward-project.eu/. downloaded Mar. 11, 2015.

A. Broder and A. Karlin, "Multilevel Adaptive Hashing", Jan. 1990, pp. 43-53.

Detti, Andrea, et al. "CONET: a content centric inter-networking architecture." Proceedings of the ACM SIGCOMM workshop on Information-centric networking. ACM, 2011.

A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.

Afanasyev, Alexander, et al. "Interest flooding attack and countermeasures in Named Data Networking." IFIP Networking Conference, 2013. IEEE, 2013.

Ao-Jan Su, David R. Choffnes, Aleksandar Kuzmanovic, and Fabian E. Bustamante. Drafting Behind Akamai: Inferring Network Conditions Based on CDN Redirections. IEEE/ACM Transactions on Networking {Feb. 2009).

Bari, MdFaizul, et al. 'A survey of naming and routing in information-centric networks.' Communications Magazine, IEEE 50.12 (2012): 44-53.

Baugher, Mark et al., "Self-Verifying Names for Read-Only Named Data", 2012 IEEE Conference on Computer Communications Workshops (INFOCOM WKSHPS), Mar. 2012, pp. 274-279.

Brambley, Michael, A novel, low-cost, reduced-sensor approach for providing smart remote monitoring and diagnostics for packaged air conditioners and heat pumps. Pacific Northwest National Laporatory, 2009.

C. Gentry and A. Silverberg. Hierarchical ID-Based Cryptography. Advances in Cryptology—ASIACRYPT 2002. Springer Berlin Heidelberg (2002).

C.A. Wood and E. Uzun, "Flexible end-to-end content security in CCN," in Proc. IEEE CCNC 2014, Las Vegas, CA, USA, Jan. 2014.

Cho, Jin-Hee, Ananthram Swami, and Ray Chen. "A survey on trust management or mobile ad hoc networks." Communications Surveys & Tutorials, IEEE 13.4 (2011): 562-583.

Compagno, Alberto, et al. "Poseidon: Mitigating interest flooding DDoS attacks in named data networking." Local Computer Networks (LCN), 2013 IEEE 38th Conference on. IEEE, 2013.

Conner, William, et al. "A trust management framework for service-oriented environments." Proceedings of the 18th international conference on World wide web. ACM, 2009.

Content Mediator Architecture for Content-aware Networks (COMET) Project [online], http://www.comet-project.org/, Downloaded Mar. 9, 2015.

D. Boneh and M. Franklin. Identity-Based Encryption from the Weil Pairing. Advances in Cryptology—CRYPTO 2001, vol. 2139, Springer Berlin Heidelberg (2001).

D.K. Smetters, P. Golle, and J.D. Thornton, "CCNx access control specifications," PARC, Tech. Rep., Jul. 2010.

Detti et al., "Supporting the Web with an information centric network that routes by name", Aug. 2012, Computer Networks 56, pp. 3705-3702.

Dijkstra, Edsger W., Wim HJ Feijen, and A_J M. Van Gasteren. "Derivation of a termination detection algorithm for distributed computations." Control Flow and Data Flow: concepts of distributed programming. Springer Berlin Heidelberg, 1986. 507-512.

E. Rescorla and N. Modadugu, "Datagram transport layer security," IETF RFC 4347, Apr. 2006.

Fayazbakhsh, S. K., Lin, Y., Tootoonchian. A., Ghodsi, A., Koponen, T., Maggs, B., & Shenker, S. {Aug. 2013). Less pain, most of the gain: Incrementally deployable ICN. In ACM SIGCOMM Computer Communication Review (vol. 43, No. 4, pp. 147-158), ACM.

G. Ateniese, K. Fu, M. Green, and S. Hohenberger. Improved Proxy Reencryption Schemes with Applications to Secure Distributed Storage. In the 12th Annual Network and Distributed System Security Sympo.

G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.

G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.

Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.

Ghali, Cesar, GeneTsudik, and Ersin Uzun. "Needle in a Haystack: Mitigating Content Poisoning in Named-Data Networking." Proceedings of NDSS Workshop on Security of Emerging Networking Technologies (SENT). 2014.

Ghodsi, Ali, et al. "Information-centric networking: seeing the forest for the trees." Proceedings of the 10th ACM Workshop on Hot Topics in Networks. ACM, 2011.

Ghodsi, Ali, et al. "Naming in content-oriented architectures." Proceedings of the ACM SIGCOMM workshop on Information-centric networking. ACM, 2011.

Gupta, Anjali, Barbara Liskov, and Rodrigo Rodrigues. "Efficient Routing for Peer-to-Peer Overlays." NSDI. vol. 4. 2004.

Heckerman, David, John S. Breese, and Koos Rommelse. "Decision-Theoretic Troubleshooting." Communications of the ACM. 1995.

Heinemeier, Kristin, et al. "Uncertainties in Achieving Energy Savings from HVAC Maintenance Measures in the Field." ASHRAE Transactions 118.Part 2 {2012).

Herlich, Matthias et al., "Optimizing Energy Efficiency for Bulk Transfer Networks", Apr. 13, 2010, pp. 1-3, retrieved for the Internet: URL:http://www.cs.uni-paderbom.de/fileadmin/informationik/ag-karl/publications/miscellaneous/optimizing.pdf (reirieved on Mar. 9, 2012).

I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.

J. Aumasson and D. Bernstein, "SipHash: a fast short-input PRF", Sep. 18, 2012.

(56) References Cited

OTHER PUBLICATIONS

J. Bethencourt, A, Sahai, and B. Waters, 'Ciphertext-policy attribute-based encryption,' in Proc. IEEE Security & Privacy 2007, Berkeley, CA, USA, May 2007, pp. 321-334.
J. Hur, "Improving security and efficiency in attribute-based data sharing," IEEE Trans. Knowledge Data Eng., vol. 25, No. 10, pp. 2271-2282, Oct. 2013.
J. Shao and Z. Cao. CCA-Seoure Proxy Re-Encryption without Pairings. Public Key Cryptography. Springer Lecture Notes in Computer Science vol. 5443 (2009).
Jacobson, Van et al. 'VoCCN: Voice Over Content-Centric Networks.' Dec. 1, 2009. ACM ReArch'09.
Jacobson et al., "Custodian-Based information Sharing," Jul. 2012, IEEE Communications Magazine: vol. 50 Issue 7 (p. 3843).
Ji, Kun, et al. "Prognostics enabled resilient control for model-based building automation systems." Proceedings of the 12th Conference of International Building Performance Simulation Association. 2011.
K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.
Katipamula, Srinivas, and Michael R. Brambley. "Review article: methods for fault detection, diagnostics, and prognostics for building systemsa review, Part I." HVAC&R Research 11.1 (2005): 3-25.
Katipamula, Srinivas, and Michael R. Brambley. "Review article: methods for fault detection, diagnostics, and prognostics for building systemsa review, Part II." HVAC&R Research 11.2 (2005): 169-187.
L. Wang et al., 'OSPFN: An OSPF Based Routing Protocol for Named Data Networking,' Technical Report NDN-0003, 2012.
L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.
Li, Wenjia, Anupam Joshi, and Tim Finin. "Coping with node misbehaviors in ad hoc networks: A multi-dimensional trust management approach." Mobile Data Management (MDM), 2010 Eleventh International Conference on. IEEE, 2010.
Lopez, Javier, et al. "Trust management systems for wireless sensor networks: Best practices." Computer Communications 33.9 (2010): 1086-1093.
M. Blaze, G. Bleumer, and M. Strauss, 'Divertible protocols and atomic prosy cryptography,' in Proc. EUROCRYPT 1998, Espoo, Finland, May-Jun. 1998, pp. 127-144.
M. Green and G. Ateniese, "Identity-based proxy re-encryption," in Proc. ACNS 2007, Zhuhai, China, Jun. 2007, pp. 288-306.
M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.
M. Naor and B. Pinkas "Efficient trace and revoke schemes," in Proc. FC 2000, Anguilla, British West Indies, Feb. 2000, pp. 1-20.
M. Nystrom, S. Parkinson, A. Rusch, and M. Scott, "PKCS#12: Personal information exchange syntax v. 1.1," IETF RFC 7292, K. Moriarty, Ed., Jul. 2014.
M. Parsa and J.J. Garcia-Luna-Aceves, "A Protocol for Scalable Loop-free Multicast Routing." IEEE JSAC, Apr. 1997.
M. Walfish, H. Balakrishnan, and S. Shenker, "Untangling the web from DNS," in Proc. USENIX NSDI 2004, Oct. 2010, pp. 735-737.
Mahadevan, Priya, et al. "Orbis: rescaling degree correlations to generate annotated internet topologies." ACM SIGCOMM Computer Communication Review. vol. 37. No. 4. ACM, 2007.
Mahadevan, Priya, et al. "Systematic topology analysis and generation using degree correlations." ACM SIGCOMM Computer Communication Review. vol. 36. No. 4. ACM, 2006.
Matteo Varvello et al., "Caesar: A Content Router for High Speed Forwarding", ICN 2012, Second Edition on Information-Centric Networking, New York, Aug. 2012.
McWilliams, Jennifer A., and Iain S. Walker. "Home Energy Article: A Systems Approach to Retrofitting Residential HVAC Systems." Lawrence Berkeley National Laboratory (2005).

Merindol et al., "An efficient algorithm to enable path diversity in link state routing networks", Jan. 10, Computer Networks 55 (2011), pp. 1132-1140.
Mobility First Project [online], http://mobilityfirst.winlab.rutgers.edu/, Downloaded Mar. 9, 2015.
Narasimhan, Sriram, and Lee Brownston. "HyDE—A General Framework for Stochastic and Hybrid Modelbased Diagnosis." Proc. DX 7 (2007): 162-169.
Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.
P. Mahadevan, E.Uzun, S. Sevilla, and J. Garcia-Luna-Aceves, "CCN-krs: A key resolution service for ccn," in Proceedings of the 1st International Conference on Information-centric Networking, Ser. INC 14 New York, NY, USA: ACM, 2014, pp. 97-106. [Online]. Available: http://doi.acm.org/10.1145/2660129.2660154.
R. H. Deng, J. Weng, S. Liu, and K. Chen. Chosen-Ciphertext Secure Proxy Re-Encryption without Pairings. CANS. Spring Lecture Notes in Computer Science vol. 5339 (2008).
Rosenberg, J. "Interactive Connectivity Establishment (ICE): A Protocol for Network Address Translator (NAT) Traversal for Offer/Answer Protocols", Apr. 2010, pp. 1-117.
S. Chow, J. Weng, Y. Yang, and R. Deng. Efficient Unidirectional Proxy Re-Encryption. Progress in Cryptology—AFRICACRYPT 2010. Springer Berlin Heidelberg (2010).
S. Deering, "Multicast Routing in Internetworks and Extended LANs," Proc. ACM SIGCOMM '88, Aug. 1988.
S. Deering et al., "The PIM architecture for wide-area multicast routing," IEEE/ACM Trans, on Networking, vol. 4, No. 2, Apr. 1996.
S. Jahid, P. Mittal, and N. Borisov, "EASiER: Encryption-based access control in social network with efficient revocation," in Proc. ACM ASIACCS 2011, Hong Kong, China, Mar. 2011, pp. 411-415.
S. Kamara and K. Lauter, "Cryptographic cloud storage," in Proc. FC 2010, Tenerife, Canary Islands, Spain, Jan. 2010, pp. 136-149.
S. Kumar et al. "Peacock Hashing: Deterministic and Updatable Hashing for High Performance Networking," 2008, pp. 556-564.
S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.
S. Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.
S.J. Lee, M. Gerla, and C. Chiang, "On-demand Multicast Routing Protocol in Multihop Wireless Mobile Networks," Mobile Networks and Applications, vol. 7, No. 6, 2002.
Sandvine, Global Internet Phenomena Report—Spring 2012. Located online at http://www.sandvine.com/downloads/ documents/Phenomenal H 2012/Sandvine Global Internet Phenomena Report 1H 2012.pdf.
Scalable and Adaptive Internet Solutions (SAIL) Project [online], http://sail-project.eu/ Downloaded Mar. 9, 2015.
Schein, Jeffrey, and Steven T. Bushby. A Simulation Study of a Hierarchical, Rule-Based Method for System-Level Fault Detection and Diagnostics in HVAC Systems. US Department of Commerce,[Technology Administration], National Institute of Standards and Technology, 2005.
Shani, Guy, Joelle Pineau, and Robert Kaplow. "A survey of point-based POMDP solvers." Autonomous Agents and Multi-Agent Systems 27.1 (2013): 1-51.
Sheppard, John W., and Stephyn GW Butcher. "A formal analysis of fault diagnosis with d-matrices." Journal of Electronic Testing 23.4 (2007): 309-322.
Shih, Eugene et al., 'Wake on Wireless: An Event Driven Energy Saving Strategy for Battery Operated Devices', Sep. 23, 2002, pp. 160-171.
Shneyderman, Alex et al., 'Mobile VPN: Delivering Advanced Services in Next Generation Wireless Systems', Jan. 1, 2003, pp. 3-29.
Sun, Ying, and Daniel S. Weld. "A framework for model-based repair." AAAI. 1993.

(56) References Cited

OTHER PUBLICATIONS

T. Ballardie, P. Francis, and J. Crowcroft, "Core Based Trees (CBT)," Proc. ACM SIGCOMM '88, Aug. 1988.
T. Dierts, "The transport layer security (TLS) protocol version 1.2," IETF RFC 5246, 2008.
The Despotify Project (2012). Available online at http://despotify.sourceforge.net/.
V. Goyal, 0. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.
V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.
V. K. Adhikari, S. Jain, Y. Chen, and Z.-L. Zhang. Vivisecting Youtube:An Active Measurement Study. In INFOCOM12 Miniconference (2012).
Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct. 2002.
Vijay Kumar Adhikari, Yang Guo, Fang Hao, Matteo Varvello, Volker Hilt, Moritz Steiner, and Zhi-Li Zhang. Unreeling Netflix: Understanding and Improving Multi-CDN Movie Delivery. In the Proceedings of IEEE INFOCOM 2012 (2012).
W.-G. Tzeng and Z.-J. Tzeng, "A public-key traitor tracing scheme with revocation using dynamic shares," in Proc. PKC 2001, Cheju Island, Korea, Feb. 2001, pp. 207-224.
Waldvogel, Marcel "Fast Longest Prefix Matching: Algorithms, Analysis, and Applications", A dissertation submitted to the Swiss Federal Institute of Technology Zurich, 2002.
Walker, Iain S. Best practices guide for residential HVAC Retrofits. No. LBNL-53592. Ernest Orlando Lawrence Berkeley National Laboratory, Berkeley, CA (US), 2003.
Wang, Jiangzhe et al.,"DMND: Collecting Data from Mobiles Using Named Data", Vehicular Networking Conference, 2010 IEEE, pp. 49-56.
Xylomenos, George, et al. "A survey of information-centric networking research." Communications Surveys & Tutorials, IEEE 16.2 (2014): 1024-1049.
Zahariadis, Theodore, et al. "Trust management in wireless sensor networks." European Transactions on Telecommunications 21.4 (2010): 386-395.
Zhang, et al., "Named Data Networking (NDN) Project", http://www.parc.com/publication/2709/named-data-networking-ndn-project.html, Oct. 2010, NDN-0001, PARC Tech Report.
Soh et al., "Efficient Prefix Updates for IP Router Using Lexicographic Ordering and Updateable Address Set", Jan. 2008, IEEE Transactions on Computers, vol. 57, No. 1.
Beben et al., "Content Aware Network based on Virtual Infrastructure", 2012 13th ACIS International Conference on Software Engineering.
Biradar et al., "Review of multicast routing mechanisms in mobile ad hoc networks", Aug. 16, Journal of Network$.
D. Trossen and G. Parisis, "Designing and realizing and information-centric Internet," IEEE Communications Magazing, vol. 50, No. 7, pp. 60-67, Jul. 2012.
Garcia-Luna-Aceves et al., "Automatic Routing Using Multiple Prefix Labels", 2012, IEEE, Ad Hoc and Sensor Networking Symposium.
Gasti, Paolo et al., 'DoS & DDoS in Named Data Networking', 2013 22nd International Conference on Computer Communications and Networks (ICCCN), Aug. 2013, pp. 1-7.
Ishiyama, "On the Effectiveness of Diffusive Content Caching in Content-Centric Networking", Nov. 5, 2012, IEEE, Information and Telecommunication Technologies (APSITT), 2012 9th Asia-Pacific Symposium.
J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.
J. Lotspiech, S. Nusser, and F. Pestoni. Anonymous Trust: Digital Rights Management using Broadcast Encryption. Proceedings of the IEEE 92.6 (2004).
Kaya et al., "A Low Power Lookup Technique for Multi-Hashing Network Applications", 2006 IEEE Computer Society Annual Symposium on Emerging VLSI Technologies and Architectures, Mar. 2006.
S. Kamara and K. Lauter. Cryptographic Cloud Storage. Financial Cryptography and Data Security. Springer Berlin Heidelberg (2010).
RTMP (2009). Available online at http://wwwimages.adobe.com/www.adobe.com/content/dam/Adobe/en/devnet/rtmp/ pdf/rtmp specification 1.0.pdf.
Hoque et al., "NLSR: Named-data Link State Routing Protocol", Aug. 12, 2013, ICN'13.
Nadeem Javaid, "Analysis and design of quality link metrics for routing protocols in Wireless Networks", PhD Thesis Defense, Dec. 15, 2010, Universete Paris-Est.
Wetherall, David, "Active Network vision and reality: Lessons form a capsule-based system", ACM Symposium on Operating Systems Principles, Dec. 1, 1999. pp. 64-79.
Kulkarni A.B. et al., "Implementation of a prototype active network", IEEE, Open Architectures and Network Programming, Apr. 3, 1998, pp. 130-142.
B. Ahlgren et al., "A Survey of Information-centric Networking," IEEE Commun. Magazine, Jul. 2012, pp. 26-36.
A. Carzaniga et al., "A Routing Scheme for Content-Based Networking," Proc IEEE Infocom '04, Mar. 2004.
Content Centric Networking Project (CCN) [online] Downloaded Mar. 9, 2015.
A. Dabirmoghaddam et al., "Understanding Optimal Caching and Opportunistic Caching at "The Edge" of Information-Centric Networks," Proc. ACM ICN 2014, Sep. 2014.
E.W. Dijkstra, and C.S. Scholten "Termination Detection for Diffusing Computations," Information Processing Letters, vol. 11, No. 1, 1980.
E.W. Dijkstra, W. Feijen, and A.J.M. Van Gasteren, "Derivation of a Termination Detection Algorithm for Distributed Computations," Information Processing Letter, vol. 16, No. 5, 1983.
J.J. Garcia-Luna-Aceves, "A Unified Approach to Loop-Free Routing Using Distance Vectors and Link States," Proc. ACM SIGCOMM '89, Aug. 1989.
J.J. Garcia-Luna-Aceves, "Name-Based Content Routing in Information Centric Networks Using Distance Information," Proc. ACM ICN 2014, Sep. 2014.
M. Gritter and D. Cheriton, "An Architecture for Content Routing Support in the Internet," Proc. USENIX Symposium on Internet Technologies and Systems, Sep. 2001.
C. Intanagonwiwat, R. Govindan, and D. Estrin, "Directed Diffusion: A Scalable and Robust Communication Paradigm for Sensor Networks," Proc. ACM MobiCom '00, 2000.
V. Jacobson et al., "Networking Named Content," Proc. IEEE CoNEXT '09, Dec. 2009.
T. Koponen et al., "A Data Oriented (and Beyond) Network Architecture," Proc. ACM SIGCOMM '07, 2007.
A.K.M. Mahmudul-Hoque et al., "NSLR: Named-Data Link State Routing Protocol," Proc. ACM ICN '13, 2013.
J. Matocha and T.Camp, "A Taxonomy of Distributed Termination Detection Algorithms," Journal of Systems and Software, 1998.
NDN Project [online] http://www.named-data.net/ Downloaded Mar. 9, 2015.
I. Solis and J.J. Garcia-Luna-Aceves, "Robust Content Dissemination in Disrupted Environments," Proc. ACM CHANTS '08, Sep. 2008.
S. Vutukury and J.J. Garcia-Luna-Aceves, "A Simple Approximation to Minimum-Delay Routing," Proc. ACM SIGCOMM '99, Aug. 1999.
G. Xylomenos et al., "A Survey of Information-centric Networking Research," IEEE Communication Surveys and Tutorials, Jul. 2013.
C. Yi et al., "Adaptive Forwarding in Named Data Networking," ACM CCR, vol. 42, No. 3, Jul. 2012.
C. Yi et al., "A Case for Statful Forwarding Plane," Computer Communications, pp. 779-791, 2013.

(56) References Cited

OTHER PUBLICATIONS

L. Zhang et al., "Named Data Networking," ACM SIGCOMM Computer Communication Review, vol. 44, No. 3, Jul. 2014.
Lui et al. (A TLV-Structured Data Naming Scheme for Content-Oriented Networking, pp. 5822-5827, International Workshop on the Network of the Future, Communications (ICC), 2012 IEEE International Conference on Jun. 10-15, 2012).
Peter Dely et al. "OpenFlow for Wireless Mesh Networks" Computer Communications and Networks, 2011 Proceedings of 20th International Conference on, IEEE, Jul. 31, 2011 (Jul. 31, 2011), pp. 1-6.
Garnepudi Parimala et al "Proactive, reactive and hybrid multicast routing protocols for Wireless Mesh Networks", 2013 IEEE International Conference on Computational Intelligence and Computing Research, IEEE, Dec. 26, 2013, pp. 1-7.
Tiancheng Zhuang et al. "Managing Ad Hoc Networks of Smartphones", International Journal of Information and Education Technology, Oct. 1, 2013.
Amadeo et al. "Design and Analysis of a Transport-Level Solution for Content-Centric VANETs", University "Mediterranea" of Reggio Calabria, Jun. 15, 2013.
Marc Mosko: "CCNx 1.0 Protocol Introduction" Apr. 2, 2014 [Retrieved from the Internet Jun. 8, 2016] http://www.ccnx.org/pubs/hhg/1.1%20CCNx%201.0%20Protocol%20Introduction.pdf *paragraphs [01.3], [002], [02.1], [0003].
Akash Baid et al: "Comparing alternative approaches for networking of named objects in the future Internet", Computer Communications Workshops (Infocom Wkshps), 2012 IEEE Conference on, IEEE, Mar. 25, 2012, pp. 298-303, *Paragraph [002]* *figure 1*.
Priya Mahadevan: "CCNx 1.0 Tutorial", Mar. 16, 2014, pp. 1-11, Retrieved from the Internet: http://www.ccnx.org/pubs/hhg/1.2%20CCNx%201.0%20Tutorial.pdf [retrieved on Jun. 8, 2016] *paragraphs [003] - [006], [0011], [0013]* * figures 1,2*.
Marc Mosko et al "All-In-One Streams for Content Centric Networks", May 24, 2015, retrieved from the Internet: http://www.ccnx.org/pubs/AllinOne.pdf [downloaded Jun. 9, 2016] *the whole document*.
Cesar Ghali et al. "Elements of Trust in Named-Data Networking", Feb. 13, 2014 Retrieved from the internet Jun. 17, 2016 http://arxiv.org/pdf/1402.3332v5.pdf *p. 5, col. 1* *p. 2, col. 1-2* * Section 4.1; p. 4, col. 2* *Section 4.2; p. 4, col. 2*.
Priya Mahadevan et al. "CCN-KRS", Proceedings of the 1st International Conference on Information-Centric Networking, Inc. '14, Sep. 24, 2014.
Flavio Roberto Santos Et al. "Funnel: Choking Polluters in BitTorrent File Sharing Communities", IEEE Transactions on Network and Service Management, IEEE vol. 8, No. 4, Dec. 1, 2011.
Liu Wai-Xi et al: "Multisource Dissemination in content-centric networking", 2013 Fourth International conference on the network of the future (NOF), IEEE, Oct. 23, 2013, pp. 1-5.
Marie-Jose Montpetit et al.: "Network coding meets information-centric networking", Proceedings of the 1st ACM workshop on emerging Name-Oriented mobile networking design, architecture, algorithms, and applications, NOM '12, Jun. 11, 2012, pp. 31-36.
Asokan et al.: "Server-Supported Signatures", Computer Security Esorics 96, Sep. 25, 1996, pp. 131-143, Section 3.
Mandl et al.: "A Fast FPGA Based Coprocessor Supporting Hard Real-Time Search", New Frontiers of Information Technology, Proceedings of the 23rd Euromicro Conference Budapest, Sep. 1, 1997, pp. 499-506 *The Whole Document*.
Sun et al.: "Content-Based Route Lookup Using CAMs", Global Communications Conference, IEEE, Dec. 3, 2012 *The Whole Document*.
Examination Report in corresponding European Application No. 15197574.5, dated Aug. 16, 2017, 6 pages.
Extended European Search Report in counterpart European Application No. 15197574.5, dated Apr. 8, 2016, 11 pages.
Hedrick, et al., "Routing Information Protocol," Network Working Group, Request for Comments: 1058, Jun. 1988, 33 pages.
Boice, et al., "Disruption-Tolerant Routing with Scoped Propagation of Control Information," IEEE International Conference on Communications, ICC '07, Jun. 2007, 8 pages.

\* cited by examiner

PENDING INTEREST TABLE 400

| NAME | FLAG | HOP COUNT | INCOMING NEIGHBORS | OUTGOING NEIGHBORS | NUMBER OF ALLOWED RETRANSMISSIONS | REMAINING LIFETIME |
|---|---|---|---|---|---|---|
| n(1) | $s(PI_{n(1)}^j)$ | $h^j(i)$ for $I[n(1),h^j(i)]$ | $IN\_SET(PI_{n(1)}^j)$ | $OUT\_SET(PI_{n(1)}^j)$ | $rc(PI_{n(1)}^j)$ | $RT(PI_{n(1)}^j)$ |
| ⋮ | ⋮ | ⋮ | ⋮ | ⋮ | ⋮ | ⋮ |
| n(j) | $s(PI_{n(j)}^j)$ | $h^j(i)$ for $I[n(j),h^j(i)]$ | $IN\_SET(PI_{n(j)}^j)$ | $OUT\_SET(PI_{n(j)}^j)$ | $rc(PI_{n(j)}^j)$ | $RT(PI_{n(j)}^j)$ — 402 |
| ⋮ | | | ⋮ | ⋮ | | |

FIG. 4

Interest-Processing Algorithm at Router $i$

1: function Process Interest
2: INPUT: $PIT^i$, $CS^i$, $FIB^i$, $I[n(j), h^I(k)]$;
3: if $n(j) \in CS^i$ then send $D[n(j), sig(j)]$ to $k$
4: if $n(j) \notin CS^i$ then
5:     if $n(j) \notin PIT^i$ then
6:         if $n(j) \notin FIB^i$ then
7:             % No route exists to $n(j)^*$:
                send $NI[n(j), \text{no route}]$ to $k$; drop $I[n(j), h^I(k)]$
8:         else
9:             if $\exists v \in S^i_{n(j)^*} \wedge (h^I(k) > h(i, n(j)^*, v))$ then
10:                % Interest can be forwarded:
                   call Forwarding Strategy($PI^i_{n(j)}$)
11:            else
12:                % Interest may be traversing a loop:
                   send $NI[n(j), \text{loop}]$ to $k$; drop $I[n(j), h^I(k)]$
13:            end if
14:        end if
15:    else
16:        % There is a PIT entry for $n(j)$:
17:        if $h^I(k) > h^I(i)$ then
18:            % Interest can be aggregated:
               $IN\_SET(PI^i_{n(j)}) = IN\_SET(PI^i_{n(j)}) \cup k$
19:        else
20:            % Interest may be traversing a loop:
               send $NI[n(j), \text{loop}]$ to $k$; drop $I[n(j), h^I(k)]$
21:        end if
22:    end if
23: end if
24: end function

FIG. 6

Interest-Forwarding Algorithm at Router $i$

1: function Forwarding Strategy
2: INPUT: $PIT^i$, $FIB^i$, MLL, $I[n(j), h^I(k)]$;
3: for each $v \in S^i_{n(j)^*}$ by rank do
4:     if $h^I(k) > h(i, n(j)^*, v)$ then
5:         $IN\_SET(PI^i_{n(j)}) = \{k\}$; $OUT\_SET(PI^i_{n(j)}) = \{v\}$;
            $RT(PI^i_{n(j)}) = MLL$; $h^I(i) = h(i, n(j)^*, v)$
            forward $I[n(j), h^I(k)]$ to $v$; return
6:     end if
7: end for
8: % No neighbor can be used in $S^i_{n(j)^*}$ :
    for each $k \in IN\_SET(PI^i_{n(j)})$ send $NI[n(j), \text{no route}]$ to $k$
9: end function

FIG. 7

NDO Message-Processing Algorithm at Router $i$

1: function Process NDO message
2: INPUT: $PIT^i$, $CS^i$, $FIB^i$, MLL, $D[n(j), sig(j)]$ received from $q$;
3: [o] verify $sig(j)$;
4: [o] if verification fails then drop $D[n(j), sig(j)]$
5: if $n(j) \in PIT^i \wedge q \in OUT\_SET(PI^i_{n(j)})$ then
6:     for each $p \in IN\_SET(PI^i_{n(j)})$ do send $D[n(j), sig(j)]$ to $p$
7:     [o] store the content with name $n(j)$ in $CS^i$;
8:     delete $PI^i_{n(j)}$
9: else
10:     drop $D[n(j), sig(j)]$
11: end if
9: end function

FIG. 8

Algorithm for Processing Interest Lifetime Expiration at Router $i$

1: function Process Interest Lifetime Expiration
2: INPUT: $PIT^i$, $RT(PI^i_{n(j)}) = 0$;
3: for each $p \in IN\_SET(PI^i_{n(j)})$ do send $NI[n(j), \text{Interest expired}]$
4: delete $PI^i_{n(j)}$
5: end function

FIG. 9

NACK Processing Algorithm at Router $i$

1: function Process NACK
2: INPUT: $PIT^i, NI[n(j), \text{CODE}]$;
3: if $n(j) \notin PIT^i$ then
4:      drop $NI[n(j), \text{CODE}]$
5: else
6:      if $k \notin OUT\_SET(PI^i_{n(j)})$ then drop $NI[n(j), \text{CODE}]$
7:      if $k \in OUT\_SET(PI^i_{n(j)})$ then
8:           for each $p \in IN\_SET(PI^i_{n(j)})$ do send $NI[n(j), \text{CODE}]$
9:           delete $PI^i_{n(j)}$
10:     end if
11: end if
12: end function

FIG. 10

Link-Failure Processing Algorithm at Router $i$

1: function Process Link Failure
2: INPUT: $PIT^i$ ;
3: for each $n(j) \in PIT^i$ do
4:     if $k \in IN\_SET(PI^i_{n(j)})$ then
5:         $IN\_SET(PI^i_{n(j)}) = IN\_SET(PI^i_{n(j)}) - \{k\}$ ;
        if $IN\_SET(PI^i_{n(j)}) = \emptyset$ then delete $PI^i_{n(j)}$
6:     end if
7:     if $k \in OUT\_SET(PI^i_{n(j)})$ then
8:         $OUT\_SET(PI^i_{n(j)}) = OUT\_SET(PI^i_{n(j)}) - \{k\}$
9:         if $OUT\_SET(PI^i_{n(j)}) = \emptyset$ then
10:             for each $p \in IN\_SET(PI^i_{n(j)})$ do
11:                 send $NI[n(j), \text{no route}]$
12.             end for
13:             delete $PI^i_{n(j)}$
14:         end if
15:     end if
16: end for
17: end function

FIG. 11

SYSTEM AND METHOD FOR DISTANCE-BASED INTEREST FORWARDING

BACKGROUND

Field

The present disclosure relates generally to a content-centric network (CCN). More specifically, the present disclosure relates to a system and method for distance-based Interest forwarding in content-centric networks (CCNs).

Related Art

The proliferation of the Internet and e-commerce continues to fuel revolutionary changes in the network industry. Today, a significant number of information exchanges, from online movie viewing to daily news delivery, retail sales, and instant messaging, are conducted online. An increasing number of Internet applications are also becoming mobile. However, the current Internet operates on a largely location-based addressing scheme. The two most ubiquitous protocols, the Internet Protocol (IP) and Ethernet protocol, are both based on end-host addresses. That is, a consumer of content can only receive the content by explicitly requesting the content from an address (e.g., IP address or Ethernet media access control (MAC) address) that is typically associated with a physical object or location. This restrictive addressing scheme is becoming progressively more inadequate for meeting the ever-changing network demands.

Recently, information-centric network (ICN) architectures have been proposed in the industry where content is directly named and addressed. Content-Centric Networking (CCN), an exemplary ICN architecture brings a new approach to content transport. Instead of having network traffic viewed at the application level as end-to-end conversations over which content travels, content is requested or returned based on its unique name, and the network is responsible for routing content from the provider to the consumer. Note that content includes data that can be transported in the communication system, including any form of data such as text, images, video, and/or audio. A consumer and a provider can be a person at a computer or an automated process inside or outside the CCN. A piece of content can refer to the entire content or a respective portion of the content. For example, a newspaper article might be represented by multiple pieces of content embodied as data packets. A piece of content can also be associated with metadata describing or augmenting the piece of content with information such as authentication data, creation date, content owner, etc.

Many existing CCN approaches rely on Interests stating a name of requested content and a nonce to retrieve content from an intended node advertising the content name. Moreover, to reduce unnecessary traffic, CCN routers often aggregate Interests so that a router only needs to forward an Interest of the same content once. However, the aggregation of Interests makes detection of Interest loops a challenge.

SUMMARY

One embodiment of the present invention provides a system for correctly processing an interest in a content-centric network (CCN). During operation, a first node in the CCN receives an interest for a piece of content from a second node. The interest indicates a name of the piece of content and a hop count from the second node to a destination node advertising the piece of content. The system determines, based on forwarding information and information associated with pending interests stored on the first node, whether a distance-based forwarding condition is met; and in response to the distance-based forwarding condition being met, accepts the interest.

In a variation on this embodiment, the forwarding information includes one or more entries associated with the name of the content piece. A respective entry specifies a next hop neighbor through which the first node can forward the interest to the destination node, and the entry further specifies a hop count from the first node to the destination node via the next hop neighbor.

In a further variation, the distance-based forwarding condition is satisfied if a hop count specified by at least one of the entries is less than the hop count indicated by the received interest.

In a further variation, in response to the distance-based forwarding condition being met, the system forwards the interest to a next hop neighbor that is highest ranked among neighbors that satisfy the distance-based forwarding condition.

In a variation on this embodiment, the information associated with pending interests includes one or more entries associated with the name of the content piece. A respective entry corresponds to a pending interest, and the entry specifies the name of the content piece and a hop count indicated by the pending interest.

In a further variation, the distance-based forwarding condition is satisfied if the hop count indicated by the pending interest is less than the hop count indicated by the received interest.

In a further variation, the entry further specifies a set of incoming neighbors from which interests for the content piece are received. In response to the distance-based forwarding condition being met, the system aggregates the received interest by adding the first node to the set of incoming neighbors.

In a variation on this embodiment, in response to the distance-based forwarding condition not being met, the system drops the interest and sends a control message back to the first node.

BRIEF DESCRIPTION OF THE FIGURES

FIG. 4 presents a diagram illustrating an exemplary Pending Interest Table (PIT), in accordance with an embodiment of the present invention.

FIG. 6 presents a diagram illustrating an exemplary Interest-processing algorithm, in accordance with an embodiment of the present invention.

FIG. 7 presents a diagram illustrating an exemplary Interest-forwarding algorithm, in accordance with an embodiment of the present invention.

FIG. 8 presents a diagram illustrating an exemplary NDO message-processing algorithm, in accordance with an embodiment of the present invention.

FIG. 9 presents a diagram illustrating an exemplary algorithm for handling an expired PIT entry, in accordance with an embodiment of the present invention.

FIG. 10 presents a diagram illustrating an exemplary NACK message-processing algorithm, in accordance with an embodiment of the present invention.

FIG. 11 presents a diagram illustrating an exemplary link-failure processing algorithm, in accordance with an embodiment of the present invention.

In the figures, like reference numerals refer to the same figure elements.

DETAILED DESCRIPTION

Overview

Figure 1:
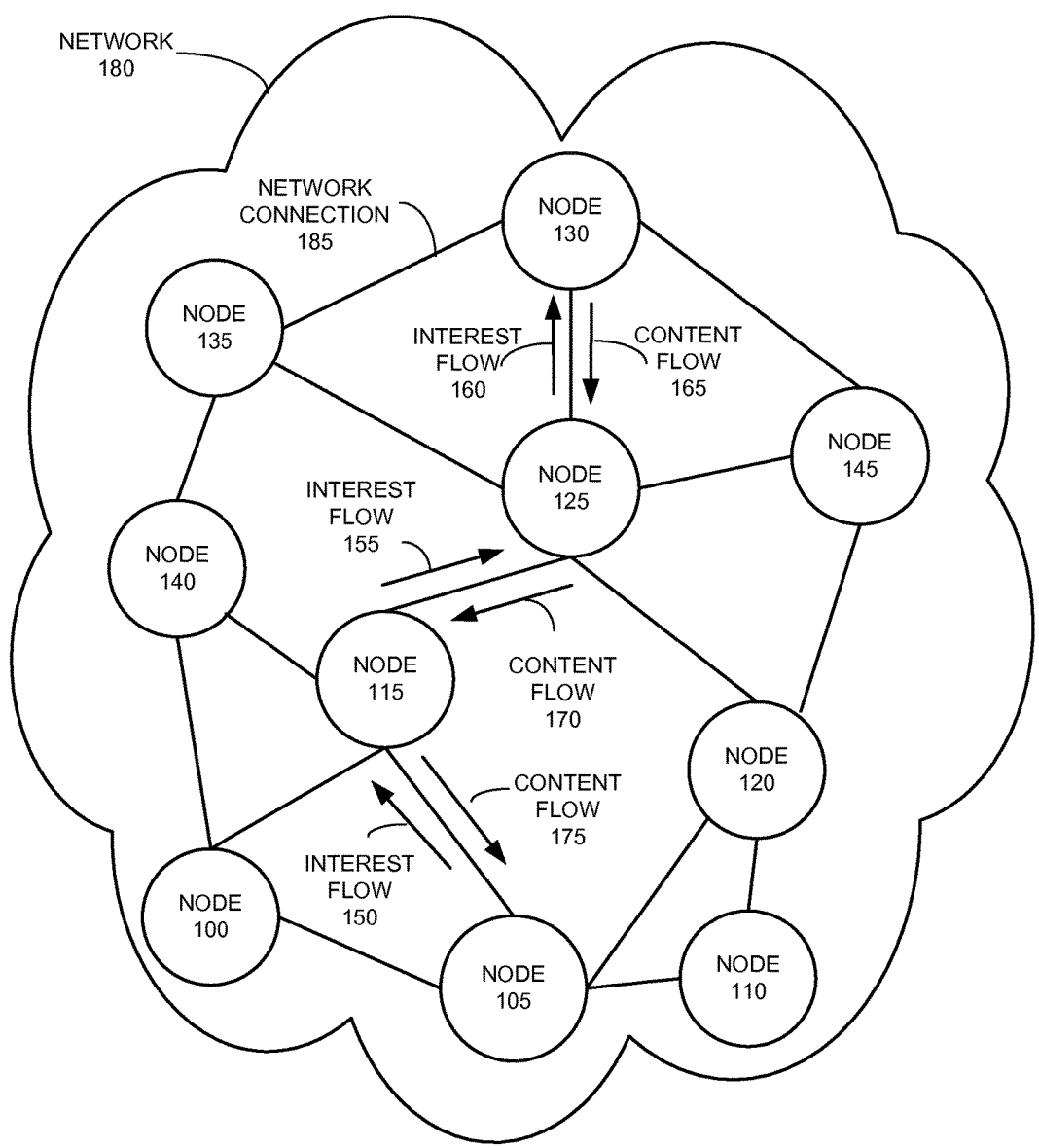
FIG. 1 illustrates an exemplary architecture of a network, in accordance with an embodiment of the present invention.

Embodiments of the present invention provide a CCN system that implements a distance-based Interest forwarding strategy, the Strategy for Interest Forwarding and Aggregation with Hop-counts (SIFAH), which works correctly when routing-table loops occur and Interests are aggregated or forwarded over multiple paths concurrently. More specifically, to implement SIFAH, each CCN router stores, in its Forward Information Base (FIB), the next hops along with the number of hops to the named content. Each forwarded Interest for named content includes the name of the requested content and a hop count from the forwarding router to the requested content. Compared with a forwarding strategy that uses nonces to identify Interest, SIFAH incurs far less storage overhead.

CCN Architecture

In general, CCN uses two types of messages: Interests and Content Objects. An Interest carries the hierarchically structured variable-length identifier (HSVLI), also called the "name," of a Content Object and serves as a request for that object. If a network element (e.g., router) receives multiple Interests for the same name, it may aggregate those Interests. A network element along the path of the Interest with a matching Content Object may cache and return that object, satisfying the Interest. The Content Object follows the reverse path of the Interest to the origin(s) of the Interest.

The terms used in the present disclosure are generally defined as follows (but their interpretation is not limited to such):

"HSVLI:" Hierarchically structured variable-length identifier, also called a Name. It is an ordered list of Name Components, which may be variable length octet strings. In human-readable form, it can be represented in a format such as ccnx:/path/part. Also the HSVLI may not be human readable. As mentioned above, HSVLIs refer to content, and it is desirable that they be able to represent organizational structures for content and be at least partially meaningful to humans. An individual component of an HSVLI may have an arbitrary length. Furthermore, HSVLIs can have explicitly delimited components, can include any sequence of bytes, and are not limited to human-readable characters. A longest-prefix-match lookup is important in forwarding packets with HSVLIs. For example, an HSVLI indicating an Interest in "/parc/home/bob" will match both "/parc/home/bob/test.txt" and "/parc/home/bob/bar.txt." The longest match, in terms of the number of name components, is considered the best because it is the most specific. Detailed descriptions of the HSVLIs can be found in U.S. Pat. No. 8,160,069, entitled "SYSTEM FOR FORWARIDNG A PACKET WITH A HIERARCHICALLY STRUCTURED VARIABLE-LENGTH IDENTIFIER," by inventors Van L. Jacobson and James D. Thornton, filed 23 Sep. 2009, the disclosure of which is incorporated herein by reference in its entirety.

"Interest:" A request for a Content Object. The Interest specifies an HSVLI name prefix and other optional selectors that can be used to choose among multiple objects with the same name prefix. Any Content Object whose name matches the Interest name prefix (and optionally other requested parameters such as publisher key-ID match) satisfies the Interest.

"Content Object:" A data object sent in response to an Interest. It has an HSVLI name and a Content payload that are bound together via a cryptographic signature. Optionally, all Content Objects have an implicit terminal name component made up of the SHA-256 digest of the Content Object. In one embodiment, the implicit digest is not transferred on the wire, but is computed at each hop, if needed. In this disclosure, the term "Content Object" and the term "Named Data Object (NDO)" are exchangeable.

"Face:" In CCN, the term face is a generalization of the concept of an interface. A face may be a connection to a network or directly to an application party. A face may be configured to send and receive broadcast or multicast packets on a particular network interface, or to send and receive packets using point-to-point addressing in the underlying transport, or using a tunnel (for example a TCP tunnel). A face may also be the connection to a single application process running on the same machine, via an encapsulation like UDP or an OS-specific inter-process communication path. All messages arrive through a face and are sent out through a face. In this disclosure, the term "neighbor" is interchangeable with the term "face," refereeing to incoming or outgoing interface of an Interest.

As mentioned before, an HSVLI indicates a piece of content, is hierarchically structured, and includes contiguous components ordered from a most general level to a most specific level. The length of a respective HSVLI is not fixed. In content-centric networks, unlike a conventional IP network, a packet may be identified by an HSVLI. For example, "abcd/bob/papers/ccn/news" could be the name of the content and identifies the corresponding packet(s), i.e., the "news" article from the "ccn" collection of papers for a user named "Bob" at the organization named "ABCD." To request a piece of content, a node expresses (e.g., broadcasts) an Interest in that content by the content's name. An Interest in a piece of content can be a query for the content according to the content's name or identifier. The content, if available in the network, is sent back from any node that stores the content to the requesting node. The routing infrastructure intelligently propagates the Interest to the prospective nodes that are likely to have the information and then carries available content back along the reverse path traversed by the Interest message. Essentially the Content Object follows the breadcrumbs left by the Interest message and thus reaches the requesting node.

FIG. 1 illustrates an exemplary architecture of a network, in accordance with an embodiment of the present invention. In this example, a network 180 comprises nodes 100-145. Each node in the network is coupled to one or more other nodes. Network connection 185 is an example of such a connection. The network connection is shown as a solid line, but each line could also represent sub-networks or super-networks, which can couple one node to another node. Network 180 can be content-centric, a local network, a super-network, or a sub-network. Each of these networks can be interconnected so that a node in one network can reach a node in other networks. The network connection can be broadband, wireless, telephonic, satellite, or any type of network connection. A node can be a computer system, an end-point representing users, and/or a device that can generate Interest or originate content.

In accordance with an embodiment of the present invention, a consumer can generate an Interest for a piece of content and forward that Interest to a node in network 180. The piece of content can be stored at a node in network 180 by a publisher or content provider, who can be located inside or outside the network. For example, in FIG. 1, the Interest in a piece of content originates at node 105. If the content is not available at the node, the Interest flows to one or more nodes coupled to the first node. For example, in FIG. 1, the Interest flows (Interest flow 150) to node 115, which does not have the content available. Next, the Interest flows (Interest flow 155) from node 115 to node 125, which again does not have the content. The Interest then flows (Interest flow 160) to node 130, which does have the content available. The flow of the Content Object then retraces its path in reverse (content flows 165, 170, and 175) until it reaches node 105, where the content is delivered. Other processes such as authentication can be involved in the flow of content.

In network 180, any number of intermediate nodes (nodes 100-145) in the path between a content holder (node 130) and the Interest generation node (node 105) can participate in caching local copies of the content as it travels across the network. Caching reduces the network load for a second subscriber located in proximity to other subscribers by implicitly sharing access to the locally cached content.

In CCN, each node (also called as a router) maintains three major data structures, including a Forwarding Information Base (FIB), a Content Store (CS), and a Pending-Interest Table (PIT).

FIB is used to forward Interest packets toward potential source(s) of matching Content Objects. Typically, a routing protocol is used to populate the FIB among all nodes in the network. In conventional CCNs, the FIB entries are often indexed by the name prefixes, with each entry including a physical address of at least one face to which the matching Interest should be forwarded. While forwarding Interest messages, longest-prefix-match lookups of names are performed at the FIB to find a matching entry.

Content Store (CS) is similar to the buffer memory used in an IP router. More particularly, CS temporarily buffers Content Objects that pass through this node, allowing efficient data retrieval by different consumers. When a router receives an Interest packet, it first checks whether there is a matching Content Object in its content store prior to issuing an Interest upstream.

Pending Interest Table (PIT) servers as a cache of Interest state. The PIT keeps track of Interests forwarded upstream toward content source(s) so that a returned Content Object can be sent downstream following the reverse Interest path to its requester(s). This preserves upstream and downstream network flow. In CCN, only Interest packets are routed. The returning Content Object follows the trail of the Interest packet back to the content requester. A PIT entry for an Interest specifies the name or name prefix of the Interest and one or multiple incoming faces that requested that Interest.

When an Interest packet arrives on a certain face, a longest-match lookup is done based on the content name, or the HSVLI. The index structure used for the name lookup is ordered in such a way that a CS match will be preferred over a PIT match, which will be preferred over an FIB match. Hence, if there is already a Content Object in CS that matches the Interest, the Content Object will be sent out via the face the Interest arrived on and the Interest will be discarded. Otherwise, the PIT will be checked to see if a match can be found. If so, the Interest's arrival face will be added to the PIT entry's requesting face list and the Interest will be discarded. Otherwise, the FIB will be checked and the Interest is forwarded along the one of more faces listed in the matching FIB entry.

Deficiency of Existing Interest-Forwarding Strategies

As described previously, in CCN, the forwarding strategy manages interactions among the FIB, PIT, and CS. More specifically, when no match can be found in its CS and PIT, a router needs to forward the received Interest upstream based on information stored in the FIB. However, it can be shown that existing forwarding strategies are not safe, in that some Interests may never return Content Objects to the consumers who issued the Interests, even if the network topology and routing are stable and all transmissions are successful.

In particular, most existing forwarding strategies rely on randomly generated numbers (nonces) to identify each Interest uniquely. For example, an Interest created by source s for a named Content Object (NDO) states n(j) and a nonce $id_j(s)$. The pair $(n(j), id_j(s))$ is used to denote an Interest uniquely with a large-enough probability. Furthermore, it is expected that the same pair can be used to detect whether an Interest is traversing a loop. In fact, the key aspect of the forwarding strategies that have been proposed for Interest-based ICN architectures, such as the CCN or the named data networking (NDN), to date is that a router determines whether or not an Interest is a duplicate Interest based solely on the content name and Interest-identification data for the Interest (such as a nonce in the NDN's case). However, the following discussion will show that such an expectation is false when Interest aggregation is implemented.

More specifically, an Interest loop of h hops for an NDO with name n(j) occurs when one or more Interests requesting n(j) are forwarded and aggregated by routers along a cycle $L=\{v_1, v_2, \ldots, v_h, v_l\}$ such that a router $v_k$ receives an Interest for NDO n(j) from a node $v_{k-1}$ while waiting for a response to the Interest it has forwarded to a router $v_{k+1}$ for the same name, with $1 \leq k \leq h$, $v_{h+1}=v_l$, and $v_0=v_h$. According to the existing NDN forwarding strategy, a router can select a neighbor to forward an Interest if such a neighbor can bring content and its performance is ranked higher than other neighbors that can also bring content. Note that the ranking of neighbors is done by a router independently of other routers. Hence, it can result in long-term routing loops implied by the FIBs if the routing protocol used in the control plane does not guarantee instantaneous loop freedom.

Figure 2A:
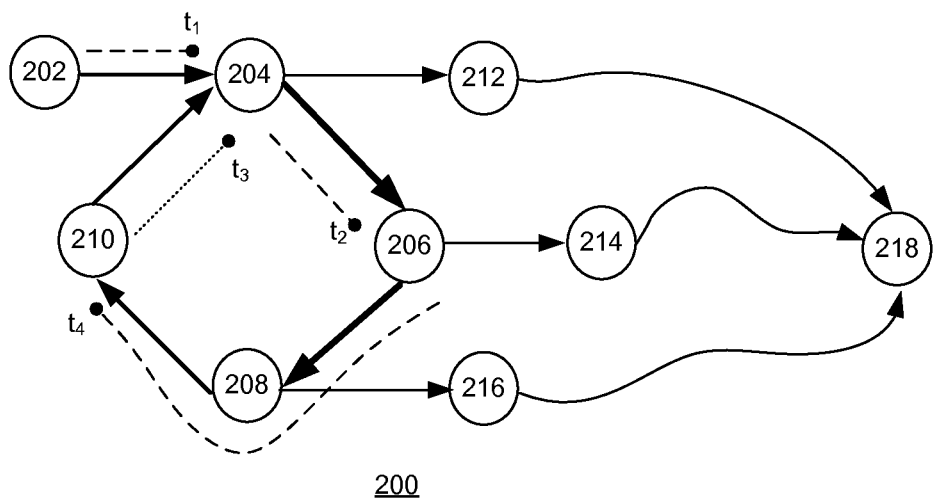
FIG. 2A presents a diagram illustrating an exemplary Interest looping in an NDN.

FIG. 2A presents a diagram illustrating an exemplary Interest looping in an NDN. In FIG. 2A, network 200 includes a number of interconnected routers, such as routers 202-218. Arrowed lines in FIG. 2A indicate the next hops to content advertised by router 218 according to the FIB entries stored in each router. As one can see, a loop consisting of routers 204, 206, 208, and 210 exists. An Interest can be forwarded from router 204 to routers 206, 208, 210, and back to router 204. In FIG. 2A, thicker lines indicate that the perceived performance of a neighbor is better than neighbors shown with thinner lines. For example, to router 204, router 206 is a better performing neighbor than router 212. One can see from FIG. 2A that the multiple paths implied in FIBs not being loop-free can cause a long-term Interest loop, even though all routing tables are consistent. In this case, the ranking of neighbors in an FIB can be such that a path with a larger hop count may be ranked higher than a path with a smaller hop count.

Also in FIG. 2A, the dashed lines indicate the traversal of Interests over links and paths, with different dash patterns representing Interests with different originators, thus having different nonces. The time when an event arrives at a router is indicated by $t_i$. For example, router 204 receives an Interest from router 202 at $t_1$, and receives an Interest for the same name but with a different nonce from router 210 at $t_3$. Similarly, router 210 receives an Interest from router 206 at $t_4$. Ideally, an Interest loop can be detected if a router notices that it receives a same Interest, as identified by the NDO name and the nonce, that was previously sent out by itself. However, in the example shown in FIG. 2A, due to Interest aggregation, router 204 is not able to detect the looping of the Interest. More specifically, FIG. 2A shows that router 210 receives an Interest (n(j),$nonce_1$), which is the same Interest sent from router 202 to router 204, from router 206 at $t_4$. However, instead of forwarding such an Interest to router 204, router 210 aggregates this Interest with the Interest of a different nonce, (n(j),$nonce_2$) arrived at router 204 at $t_3$. In other words, router 204 only sees (n(j),$nonce_2$) sent from router 210. Similarly, router 204 also aggregates the Interest received from router 210 (i.e., (n(j),$nonce_2$)), and only sends out the Interest received from router 202 (i.e., (n(j),$nonce_1$)). Therefore, an Interest loop is formed without being detected by router 204.

Figure 2B:
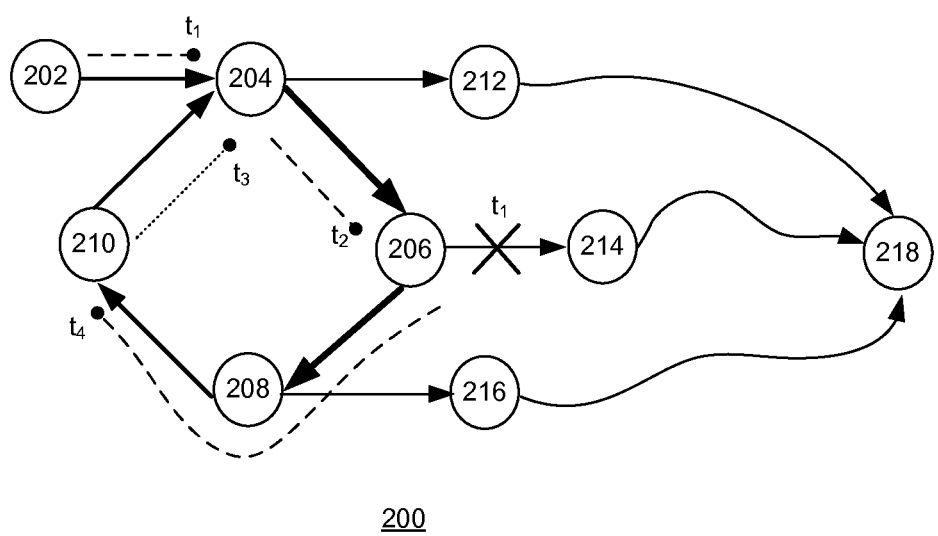
FIG. 2B presents a diagram illustrating an exemplary Interest looping in an NDN.

Moreover, in situations where routing tables are inconsistent as a result of network or content dynamics, Interest loops can go undetected even if the control plane supports only single-path routing to content. FIG. 2B presents a diagram illustrating an exemplary Interest looping in an NDN. FIG. 2B shows the same exemplary network 200 shown in FIG. 2A, except that, in the example shown in FIG. 2B, the routing is single path, and the network topology changes at $t_1$, when the link between routers 206 and 214 fails. Similar to the example shown in FIG. 2A, router 204 aggregates the Interest from router 210 and router 210 aggregates the Interest from router 208, and these combined steps preclude the detection of the temporary Interest looping.

Indeed, one can prove that the NDN forwarding strategy is not safe in a stable, error-free network in which Interest loops occur, even if nonces were to denote Interests uniquely. In addition, it can also be proven that no forwarding strategy with Interest aggregation and Interest loop detection based on the matching of Interest-identification data is safe. A simplified proof is to map the Interest-processing strategy of the NDN, and any forwarding strategy that attempts to detect Interest loops by matching Interest-identification data, to the problem of distributed termination detection over a cycle, where Interests serve as the tokens of the algorithm. Because Interest aggregation erases a token traversing the ring (Interest loop) when any node in the ring has previously created a different token, correct termination detection over the ring (i.e., Interest loop detection) cannot be guaranteed in the presence of Interest aggregation.

Strategy for Interest Forwarding and Aggregation with Hop-Counts (SIFAH)

One obvious correct Interest-processing strategy is to specify source routes in the Interests. Because a source-routed Interest must traverse the route stated in it or be dropped, no loops can be traversed by any Interest. However, this requires all routers in the ICN to have complete topology information or at least path information for each destination, which does not scale with the number of nodes and Content Objects in the network. Furthermore, source routing of Interests makes Interest processing overly complex, and reveals the identity of the source router requesting content.

On the other hand, nonces used in the NDN can only ensure that Interests are denoted uniquely with some probability that is large enough to be acceptable in practice, while still incurring considerable storage overhead. More importantly, as discussed in the previous section, using nonces or identifying Interests uniquely is useless for Interest-loop detection when Interests are aggregated. Hence, one needs to implement a forwarding strategy that enables, independently of the identity of an Interest, at least one router to detect the existence of the Interest loop. One way to detect such an Interest loop is to detect that the Interest is traversing a path that is not getting the Interest closer to a node that has advertised the requested content.

Note that distance information or some other ordering information is needed in any Interest-based ICN to allow routers to forward Interests toward the nearest instances of requested content, rather than flooding the network with Interests or carrying out random walks of the network searching for content. The same information can also be used to ensure that Interests are forwarded in a way that gets them closer to nodes that advertised the requested content. Given that the FIBs are populated from the routing tables maintained in the control plane of an ICN, they constitute a readily available tool to establish the proper interaction between the forwarding strategy operating in the data plane and the distances to advertised content maintained by the routing protocol operating in the control plane. Hence, a distance-based Interest-forwarding strategy can be a solution for loop detection when Interests are aggregated or forwarded over multiple paths concurrently.

In some embodiments, the system implements a Strategy for Interest Forwarding and Aggregation with Hop-counts (SIFAH). More specifically, under SIFAH, the routers adopt a retransmission strategy for Interests such that every PIT entry is stored long enough at any one router to enable any Interest loop that occurs to be detected. More specifically, a hop count that specifies the number of hops from the current node to the node storing the requested content is included in the Interest being transmitted, along with the name of the requested content. When a router receives an Interest, it first checks for matches, based on the content name, in the CS and the PIT. If no match is found, the router compares the hop count indicated in the received Interest with the hop count of the current router (the number of hops from the router to the content). If the hop count in the received Interest is smaller than the hop count of the router, the router assumes that an Interest loop occurs. The router then sends a notification to the node that forwarded such an Interest, and drops the Interest.

Figure 3:
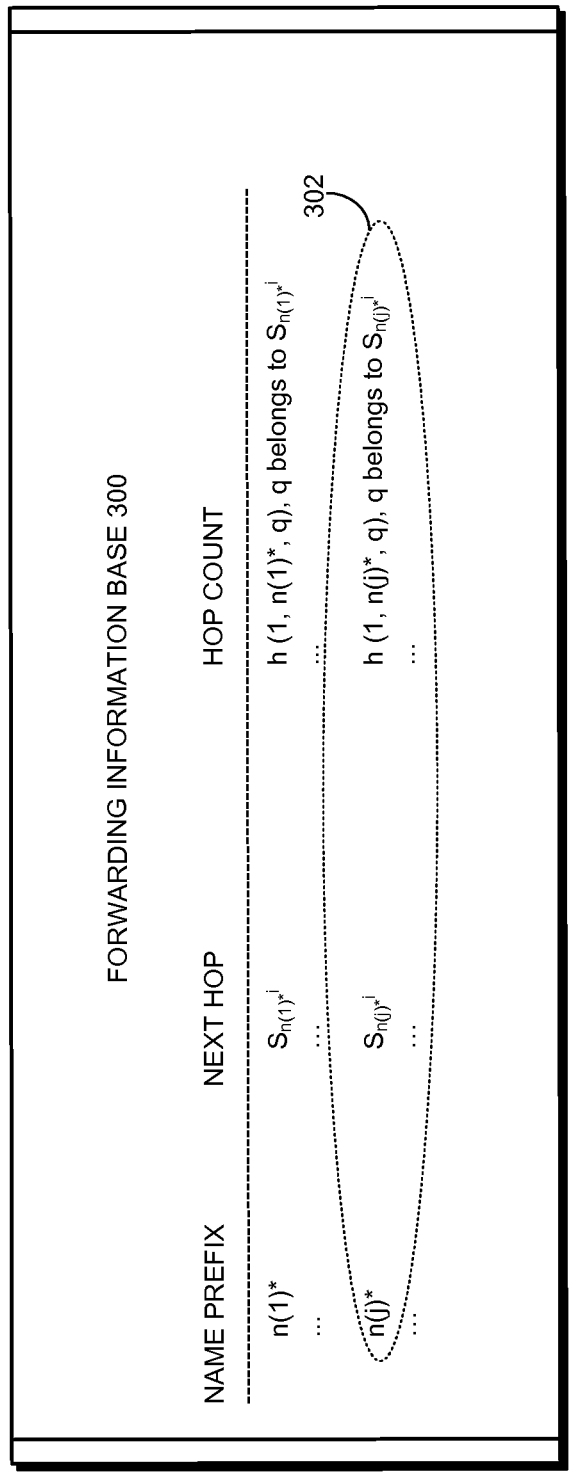
FIG. 3 presents a diagram illustrating an exemplary Forwarding Information Base (FIB), in accordance with an embodiment of the present invention.

FIG. 3 presents a diagram illustrating an exemplary Forwarding Information Base (FIB), in accordance with an embodiment of the present invention. In FIG. 3, FIB 300 includes a number of entries indexed using content name prefixes. Each entry states the next hop to the content identified by the name prefix and a hop count to the node advertising the name prefix. For notation purposes, at router i, the FIB is denoted as $FIB^i$, and each FIB entry for a name prefix $n(j)*$ is denoted as $FIB_{n(j)*}^i$, such as FIB entry 302. Note that each FIB entry may include a list of one or more tuples. Each tuple states a next hop and a hop count to $n(j)*$. The set of next hops to $n(j)*$ listed in the $FIB_{n(j)*}^i$ is denoted as $S_{n(j)*}^i$, and the hop count to $n(j)*$ through neighbor q, $q \in S_{n(j)*}^i$, is denoted as $h(i,n(j)*,q)$.

FIG. 4 presents a diagram illustrating an exemplary Pending Interest Table (PIT), in accordance with an embodiment of the present invention.

In FIG. 4, PIT 400 includes a number of entries indexed using names of the NDOs. At router i, the PIT is denoted as $PIT^i$, and $PI_{n(j)}^i$ denotes the entry created in $PIT^i$ with name $n(j)$. Each entry in the PIT specifies the name of the NDO, a flag stating whether the Interest has been satisfied with an NDO, the hop count assumed by the router when it forwards the Interest, the set of incoming neighbors from which Interests for the NDO are received, the set of outgoing neighbors to whom the router forwards its Interests, the number of retransmissions allowed for the same Interest, and the remaining lifetime for the Interest. The notation for each component of the PIT entry is illustrated in FIG. 4. For example, PIT entry $PI_{n(j)}^i$, or entry 402 in FIG. 4, includes an NDO name $n(j)$, a flag $s(PI_{n(j)}^i)$, a hop count $h^I(i)$ assumed by router i when it forwards Interest $I[n(j),h_{n(j)}^I]$, a set of incoming neighbors $IN\_SET(PI_{n(j)}^i)$, a set of outgoing neighbors $OUT\_SET(PI_{n(j)}^i)$, the number of allowed retransmissions $rc(PI_{n(j)}^i)$, and the remaining lifetime $RTT(PI_{n(j)}^i)$.

Note that, compared with the FIBs and PITs used in conventional ICNs, the FIB and PIT shown in FIGS. 3 and 4 include additional information associated with the distance to the content, such as the hop count. This information can be obtained when the routing protocol populates the FIBs among the routers. However, special attention must be paid to the fact that updates made to the FIBs stored at routers occur independently of and concurrently with the updates made to their PITs. For example, once a router has forwarded an Interest that assumed a given distance to content prefix $n(j)*$ and waits for the Interest to return a data object, its distance to the same content may change based on an update to its FIB. Hence, simply comparing the minimum distance from a router to content against a distance to content stated in an Interest is not enough to prevent Interests from being incorrectly forwarded to routers that are farther away from the requested content.

In some embodiments of the present invention, the system that implements SIFAH takes into account the fact that FIBs and PITs are updated independently by requiring that a router that forwards an Interest for a given piece of content remembers in its PIT entry the value of the distance to the content assumed when it issues its Interest. A router can then determine whether an Interest may be propagating over an Interest loop based on the hop count to the content. Storing hop-count distances in the FIB provides two advantages, including that it incurs less storage overhead than storing complex distance values, and that it enables ranking of the next hops to a prefix stored in the FIB based on the actual distances to content.

As discussed previously, to implement distance-based forwarding, a router k requesting NDO $n(j)$ sends an Interest that includes the NDO name and a hop count $h^I(k)$, which states the hop count from router k to the name prefix $n(j)*$ that best matches NDO name $n(j)$ when router k forwards the Interest. The Interest is denoted as $I[n(j),h^I(k)]$. In some embodiments, a router i can accept such an Interest from router k only if one of the following two conditions is satisfied:

$$n(j) \notin PIT^i \wedge \forall v(v \in S_{n(j)*}^i \wedge h^I(k) > h(i,n(j)*,v)); \quad \text{Condition 1):}$$

or, $$n(j) \in PIT^i \wedge h^I(k) > h^I(i). \quad \text{Condition 2):}$$

This rule is also called a Hop-Count Forwarding with Aggregation Rule (HFAR).

The first condition ensures that router i accepts an Interest from neighbor k only if router i determines that it is closer to name prefix $n(j)*$ through at least one neighbor (neighbor v that belongs to the set of next hops to $n(j)*$ listed in the $FIB_{n(j)*}^i$) than router k was when it sent its Interest. The second condition ensures that router i accepts an Interest from neighbor k only if router i was closer to name prefix $n(j)*$ than router k when both routers sent their Interests. Note that the hop count from router i to name prefix $n(j)*$ is stored in $PIT^i$.

Note that these two conditions are sufficient to ensure that an Interest loop cannot occur without a router in the loop detecting that the Interest has been forwarded incorrectly. This result is independent of whether Interests are aggregated or sent over one or multiple paths, or how Interests are retransmitted. Although such conditions are not necessary to detect loops (there are cases in which these conditions are not satisfied even though no Interest loops exist), given that FIBs are updated to reflect correct hop counts, a sufficient condition for loop detection operating with multipath routing is a good baseline for a forwarding strategy in Interest-based ICNs.

Figure 5:
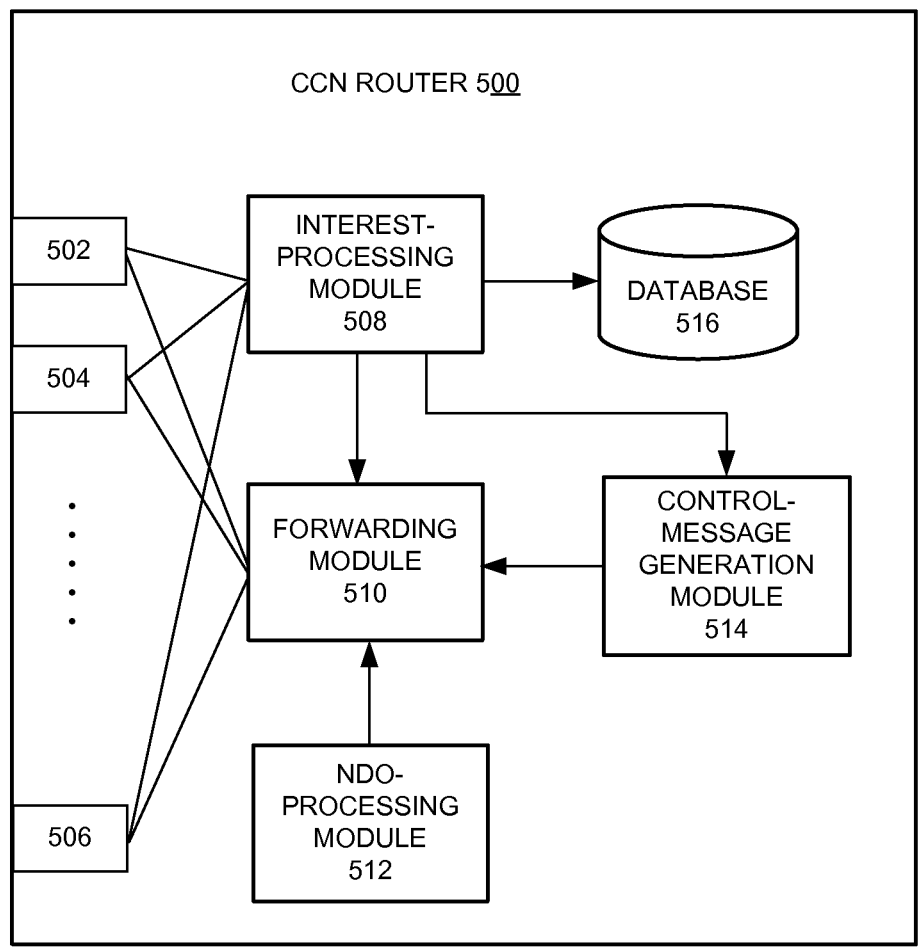
FIG. 5 presents a diagram presenting an exemplary architecture of a CCN router, in accordance with an embodiment of the present invention.

FIG. 5 presents a diagram presenting an exemplary architecture of a CCN router, in accordance with an embodiment of the present invention. In FIG. 5, CCN router 500 includes a number of faces, such as faces 502, 504, and 506; an Interest-processing module 508; a forwarding module 510; an NDO-processing module 512; a control-message generation module 514; and a database 516.

Faces 502-506 can include not only physical interfaces but also application processes capable of sending and receiving packets, including Interests and NDOs. Interest-processing module 508 is responsible for processing Interest received on the various faces. In some embodiments, Interest-processing module 508 determines whether to accept the incoming Interest based on the aforementioned conditions. Forwarding module 510 is responsible for forwarding packets, such as Interests or Content Objects, to the faces. NDO-processing module 512 is responsible for processing NDO messages received in response to Interests. Control-message generation module 514 generates control messages, which can include different NACK messages. In some embodiments, control-message generation module 514 generates NACK messages under various conditions, including but not limited to when: an Interest loop is detected, no route is found toward the requested content, no content is found, and the PIT entry expires. A NACK message in response to an Interest for name $n(j)$ is denoted $NI[n(j), CODE]$, where CODE states the condition under which the NACK is sent. Database 516 stores the three essential data structures for CCN operation: the Content Store, the Forwarding Information Base, and the Pending Information Table.

FIG. 6 presents a diagram illustrating an exemplary Interest-processing algorithm, in accordance with an embodiment of the present invention. From FIG. 6, one can see that, when Interest-processing module 508 of a router i receives an Interest $I[n(j),h^I(k)]$ from a neighbor k, it first checks the Content Store $CS^i$ for a match. If a match is found, forwarding module 510 returns the matching NDO to neighbor k. Note that $D[n(j), sig(j)]$ denotes a content-object message sent in response to Interest $I[n(j),h^I(k)]$. Such a content-object message states the name of the Interest, a signature payload sig(j) used to validate the content object, and the content object itself.

If no match is found in the Content Store and the PIT, Interest-processing module 508 checks the FIB for a match. If no match is found in the FIB, it is determined that no route exists to the requested content. In response, control-message generation module 514 generates a NACK message NI[n(j), no route], stating that the NACK is issued because no route is found. Subsequently, forwarding module 510 forwards the NACK to neighbor k, and Interest-processing module 508 drops the received Interest.

If a match is found in the FIB, Interest-processing module 508 determines whether the aforementioned condition (1) is met, i.e., whether router i is closer to name prefix $n(j)^*$ through at least one neighbor than router k was when it sent its Interest. If so, it is determined that the Interest can be forwarded, and forwarding module 510 forwards the Interest based on the appropriate forwarding algorithm. If condition (1) is not met, it is determined that the Interest may be traversing a loop. In response, control-message generation module 514 generates a NACK message NI[n(j),loop], stating that the NACK is issued because a loop is found. Subsequently, forwarding module 510 forwards the NACK to neighbor k, and Interest-processing module 508 drops the received Interest.

If a match to the Interest name is found in the PIT, Interest-processing module 508 determines whether the aforementioned condition (2) is met, i.e., whether router i was closer to name prefix $n(j)^*$ than router k when both routers sent their Interests. If so, it is determined that the Interest can be aggregated. In response, the PIT is updated by adding router k to the set of incoming neighbors from which Interests for n(j) are received. If condition (2) is not met, it is determined that the Interest may be traversing a loop. In response, control-message generation module 514 generates a NACK message NI[n(j),loop], stating that the NACK is issued because a loop is found. Subsequently, forwarding module 510 forwards the NACK to neighbor k, and Interest-processing module 508 drops the received Interest.

When implementing the Interest-processing algorithm, it is assumed that content requests from local content consumers are sent to the router in the form of Interests stating infinite hop counts to content, and each router knows which neighbors are remote and which are local.

FIG. 7 presents a diagram illustrating an exemplary Interest-forwarding algorithm, in accordance with an embodiment of the present invention. Note that a router typically assumes a Maximum Interest Lifetime (MIL) for Interests remaining in its PIT, and deletes an Interest from its PIT if it exceeds the MIL. The MIL should be large enough to preclude an excessive number of retransmissions. On the other hand, the MIL should not be so large as to cause the PIT to store too many Interests for which no NDO messages or NACKs will be sent due to failures or transmission errors. For example, a few seconds would be a viable value for an MIL. In practice, however, the consumer submitting an Interest to its local router could provide an initial value for the Interest lifetime estimated over a number of Interests submitted for NDOs in the same NDO group corresponding to a large piece of content (e.g., a movie). This is especially the case given our assumption that Interest retransmissions are carried out by content consumers rather than by routers.

According to the Interest-forwarding algorithm shown in FIG. 7, a router i simply selects the first neighbor v in the ranked list of neighbors stored in the FIB for prefix $n(j)^*$ that satisfies the aforementioned condition (1). If no neighbors can be used in the set listed in the FIB, control-message generation module 514 generates a NACK message NI[n(j), no route] for each neighbor in the incoming set, and forwarding module 510 forwards the NACK messages accordingly.

More sophisticated strategies can be devised that attain load balancing among multiple available routes toward the requested content and can be close to optimum. In addition, the same Interest could be forwarded over multiple paths concurrently, in which case content is sent back over each path that the Interest traversed successfully. To be effective, however, these approaches must require the adoption of a loop-free multipath routing protocol in the control plane. In this context, the control plane establishes valid multipaths to content prefixes using long-term performance measures, and the data plane exploits those paths using the distance-based forwarding strategy (such as SIFAH) and short-term performance measurements, without risking the long delays associated with backtracking due to looping.

FIG. 8 presents a diagram illustrating an exemplary NDO message-processing algorithm, in accordance with an embodiment of the present invention. According to the algorithm shown in FIG. 8, a router accepts an NDO received from a neighbor if it has a PIT entry waiting for the content and the NDO came from one of the neighbors over which the Interest was sent. Note that the algorithm includes optional operations (indicated by "[o]") for signature verification and content caching (according to the caching strategy used in the ICN, which can be path-based or edge-based). The router forwards the valid NDO to any neighbor that requested it and deletes the corresponding PIT entry.

FIG. 9 presents a diagram illustrating an exemplary algorithm for handling an expired PIT entry, in accordance with an embodiment of the present invention. When a PIT entry with the name n(j) expires with no NDO or NACK being received, given that routers do not initiate Interest retransmissions, a router i simply sends NACKs to all neighbors from which it received Interests for name n(j). A more sophisticated approach would be needed for the case of ICNs in which routers must provide Interest retransmissions.

FIG. 10 presents a diagram illustrating an exemplary NACK message-processing algorithm, in accordance with an embodiment of the present invention. According to the algorithm shown in FIG. 10, router i forwards the NACK it receives for n(j) to all those neighbors from whom it received Interests for n(j) and deletes the Interest entry after that. Supporting Interest retransmissions by routers would require a more complex approach for the handling of NACKs.

FIG. 11 presents a diagram illustrating an exemplary link-failure processing algorithm, in accordance with an embodiment of the present invention. Note that, when the connection over a link fails, a router can react to the failure of perceived connectivity with a neighbor over which Interests have been forwarded by simply waiting for the lifetimes of those Interests to expire. However, such an approach can be very slow to react to link failures compared to the algorithm shown in FIG. 11. This algorithm assumes that the control plane updates FIB to reflect any changes in hop counts to name prefixes resulting from the loss of connectivity to one or more neighbors. In the example shown in FIG. 11, when router i detects a connectivity failure on link (i, k), for each Interest that was forwarded over the failed link, router i sends a NACK to all neighbors whose Interests were aggregated. More specifically, if neighbor k belongs to the set of incoming neighbors, router i simply removes neighbor k from the set. On the other hand, if neighbor k is the only outgoing neighbor for n(j), router i needs to identify the incoming neighbors for the Interest and send a NACK stating no route to those incoming neighbors.

Operation Examples

Figure 12A:
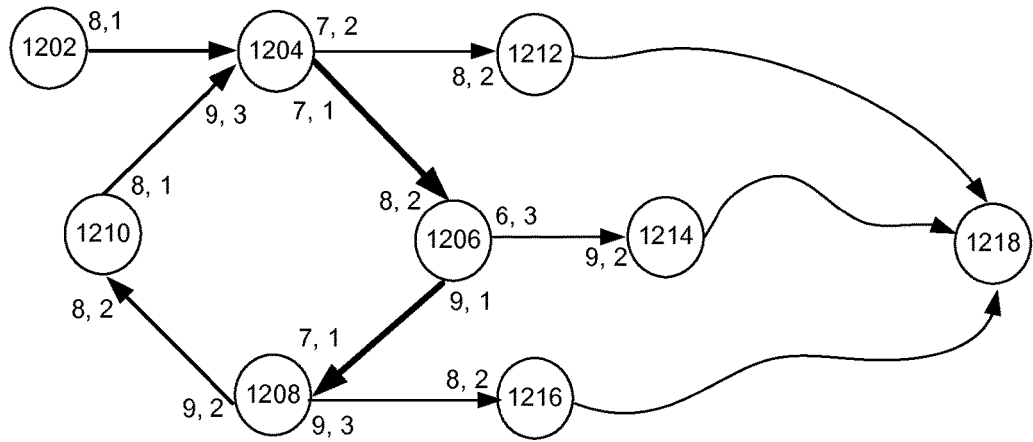
FIGS. 12A-12B present a diagram illustrating an operation example of SIFAH, in accordance with an embodiment of the present invention.
Figure 12B:
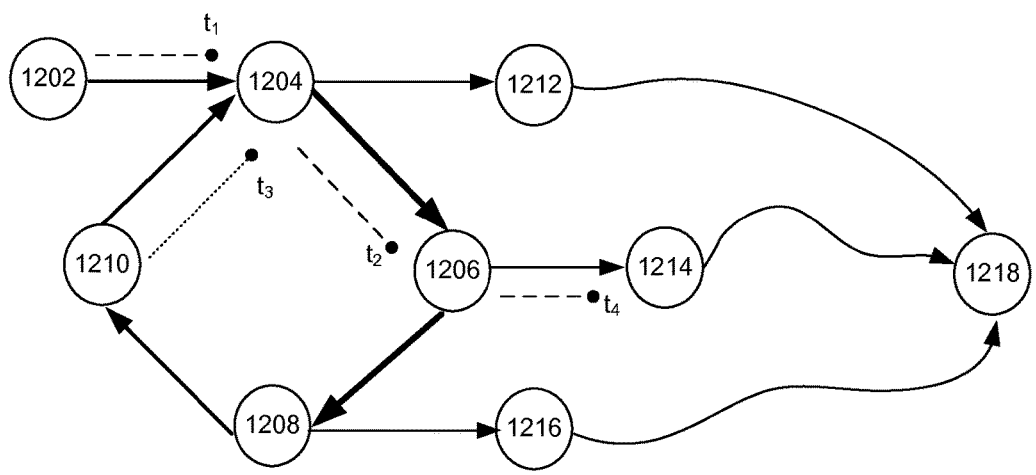

FIGS. 12A-12B present a diagram illustrating an operation example of SIFAH, in accordance with an embodiment of the present invention. More specifically, FIG. 12A illustrates the routing information as determined by the control plane, and FIG. 12B illustrates how Interests traverse the links. Similar to what's shown in FIG. 2A, in FIG. 12A, network 1200 includes a number of nodes, such as nodes 1202-1218, with arrowed lines indicating the next hops to content (with a name n(j)) advertised by router 1218 according to the FIB entries stored in the routers. The example shown in FIGS. 12A-12B is used to demonstrate the operation in a case where the control plane establishes multiple paths to each name prefix but does not guarantee loop-free routing tables. In this example, it is assumed that: (a) routers execute a routing protocol that does not enforce loop-free FIBs; and (b) the ranking of neighbors is determined independently at each router using some data-plane strategy based on the perceived performance of each path and interface. Note that the distance value of a path need not be directly proportional to the hop count value of the path shown in the figure.

As shown in FIG. 12A, multiple paths exist between nodes 1202 and 1218, and the routing table may include a loop: node 1204-node 1206-node 1208-node 1210-node 1204. In addition, in FIG. 12A, at each link outgoing from a router to its neighbors a pair of numbers is listed, indicating a hop count (the first number) through the neighbor to n(j) and the rank of the neighbor in the FIB (the second number). Note that for the same link there might be two pairs, and each pair is stored at the FIB in the router that is closer to the pair. For example, on the link from router 1204 to router 1206, two number pairs, pair (7, 1) and pair (8, 2) are shown next to the link. Number pair (7, 1) is adjacent to router 1204 and is stored in the FIB of router 1204, and number pair (8, 2) is adjacent to router 1206 and is stored in the FIB of router 1206. More specifically, the number pair (7, 1) adjacent to router 1204 indicates that the hop count from its neighbor 1206 is 7, and neighbor 1206 ranks number 1 in the FIB of router 1204. On the other hand, the number pair (8, 2) adjacent to router 1206 indicates that the hop count from its neighbor 1204 is 8, and neighbor 1204 ranks number 2 in the FIB of router 1206.

One can use a tuple (v:h,r) to indicate a neighbor, its hop count, and its ranking. Note that such a tuple can be entries listed in the FIB under name prefix n(j)*. For example, $FIB^{node\ 1204}$ can list tuples (Node 1206:7,1), (Node 1212:7, 2), and (Node 1210:9,3). Similarly, $FIB^{node\ 1202}$ can list a tuple (Node 1204:8,1); $FIB^{node\ 1206}$ can list tuples (Node 1208:9,1), (Node 1204:8,2), and (Node 1214:6,3); $FIB^{node\ 1208}$ can list tuples (Node 1206:7,1), (Node 1210:9, 2), and (Node 1216:9,3); and $FIB^{node\ 1210}$ can list tuples (Node 1204:8,1) and (Node 1208:8,2). Note that partial FIB entries for nodes 1212, 1214, and 1216 are also shown in FIG. 12A.

Similar to what is shown in FIG. 2B, FIG. 12B illustrates the forwarding of the Interests. In the example shown in FIG. 12B, router 1202 originates an Interest for name n(j) and sends Interest I[n(j),$h^I$ (Node 1202)] to router 1204, with $h^I$ (Node 1202)=8. Router 1204 receives the Interest at time $t_1$, and given that $h^I$ (Node 1202)>h(Node 1204, n(j)*, Node 1206)=7, accepts the Interest because it has at least one neighbor (router 1206) that satisfies HFAR, more specifically, condition (1). Router 1204 sends Interest I[$_n$(j), $h^I$ (Node 1204)] to router 1206, with $h^I$ (Node 1204)=7, to router 1206 because router 1206 is the highest-ranked neighbor that satisfies HFAR. Router 1204 receives I[n(j), $h^I$ (Node 1210)], with $h^I$ (Node 1210)=8 from router 1210 at time $t_3$, which is greater than $t_1$, and aggregates such Interest because router 1204 sent an Interest earlier with a smaller hop count. More specifically, router 1204 sent I[n(j), $h^I$ (Node 1204)] at time $t_1$, with a hop count $h^I$ (Node 1204)=7 that is smaller than hop count $h^I$ (Node 1210)=8. On the other hand, router 1206 receives Interest I[n(j),$h^I$ (Node 1204)] at time $t_2$, which is greater than $t_1$, and accepts it because it has at least one neighbor that satisfies HFAR. More specifically, $h^I$ (Node 1204)>h(Node 1206, n(j)*, Node 1214)=6. Router 1206 then sends Interest I[n(j),$h^I$ (Node 1204)] to router 1214, because router 1214 is the highest-ranked neighbor to router 1206 that satisfies HFAR. Such Interest reaches router 1214 at $t_4$.

As one can see from the example shown in FIGS. 12A-12B, the Interests are forwarded along loop-free paths if the routers implement SIFAH and the FIBs maintained by the routers have consistent information, even if some of the multipaths implied in the FIBs involve loops. It can be proven that, in general, Interest loops cannot occur and be undetected in an ICN in which SIFAH is implemented. It can also be proven that SIFAH is safe in an ICN that is free of faults and transmission errors.

Figure 13A:
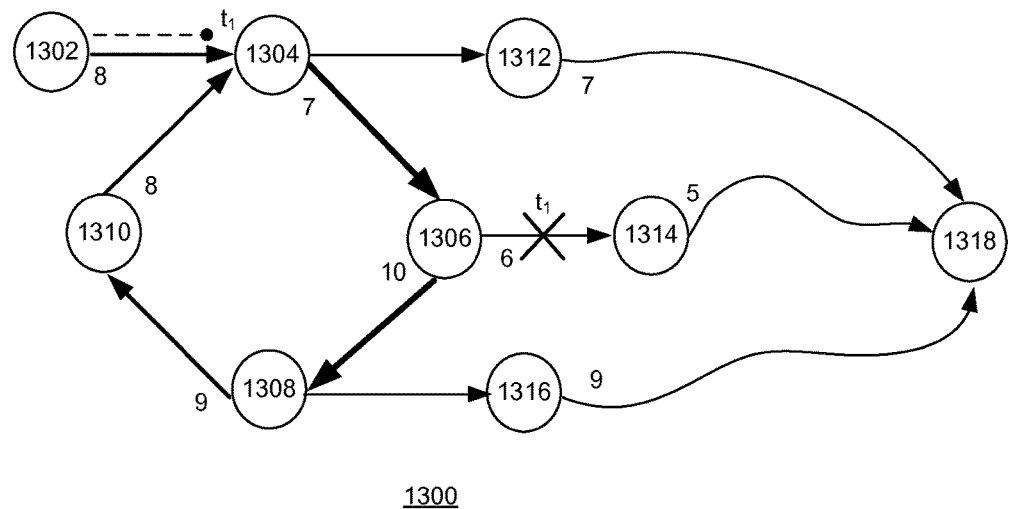
FIGS. 13A-13B present a diagram illustrating an operation example of SIFAH, in accordance with an embodiment of the present invention.
Figure 13B:
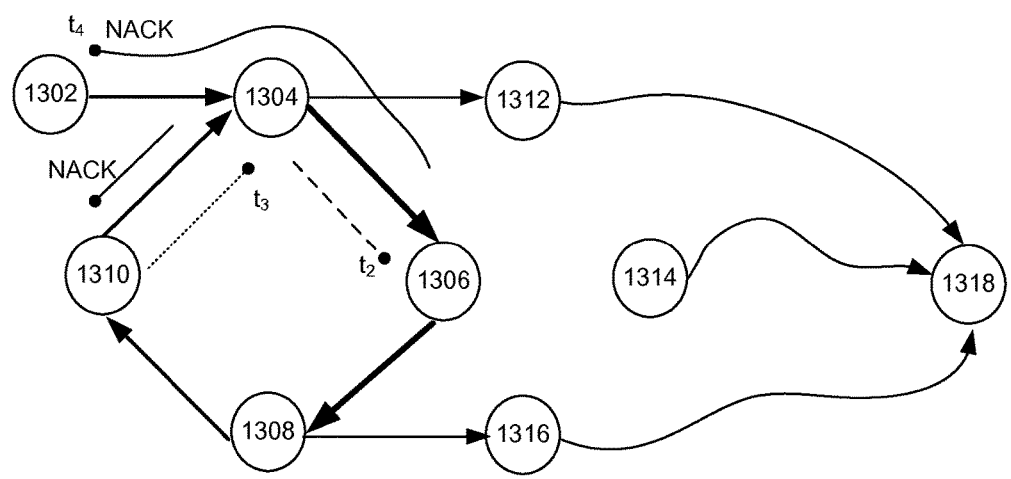

FIGS. 13A-13B present a diagram illustrating an operation example of SIFAH, in accordance with an embodiment of the present invention. More specifically, the example shown in FIGS. 13A-13B is used to demonstrate the operation in a case where the control plane only uses single-path routing. In FIG. 13A, each router has a single next hop and one hop count for each prefix listed in its FIB. For example, for a name prefix n(j)* advertised by router 1318, router 1304 lists a hop count of 7 via neighbor router 1306, and router 1306 lists a hop count of 10 via neighbor router 1308. When the link between router 1306 and router 1314 fails, router 1306 updates its FIB to reflect the link failure at time $t_1$, while router 1302 sends an Interest to router 1304 requesting n(j). Routers in network 1300 may have inconsistent FIB states for n(j) while routing updates propagate and Interests are being forwarded.

FIG. 13B illustrates how Interests and NACKs traverse the links. As shown in FIG. 13B, router 1306 must send a NACK message NI[n(j),loop] to router 1304, because?=$h^I$ (Node 1304)≯h(Node 1306, n(j)*, Node 1308)=10 and HFAR is not satisfied. In return, when router 1304 receives the NACK from router 1306, it must forward the NACK to router 1302 and to router 1310. Eventually, the routing protocol running in the control plane makes routers 1304 and 1302 change the hop count to n(j)* in their FIBs to reflect the failure of link (router 1306, router 1314). At that point, a retransmission of the Interest from router 1302 would state $h^I$ (Node 1302)=9 and would make router 1304 forward Interest I[n(j),$h^1$ (Node 1304)=8] to router 1312.

As discussed previously, the distance-based forwarding strategy, i.e., SIFAH, provides a number of advantages, among which is the small storage overhead compared with that incurred with the conventional NDN forwarding strategy. In SIFAH, router i uses only the hop count value $h^I(i)$ to determine whether the Interest it receives from router k may be traversing an Interest loop, and does not store $h^I(k)$. Hence, the PIT storage size for a router implementing SIFAH can be estimated as $SS_{SIFAH} = O((INT + |mh|)|PIT^i|_{SIFAH})$, where $|PIT^i|_{SIFAH}$ is the number of pending Interests in $PIT^i$ when SIFAH is used, $|mh|$ is the number of bits used to store $h^I(i)$, and INT is the average storage required to maintain information about the incoming and outgoing neighbors for a given Interest. For a given NDO with name n(j), the amount of storage needed to maintain the incoming and outgoing neighbors is $IN\_SET(PI_{n(j)}^I) + OUT\_SET(PI_{n(j)}^I)$.

By contrast, the NDN forwarding strategy requires each router to store the list of different nonces used to denote valid Interests for a given NDO name n(j). With each nonce being of size $|id|$ and router i having up to I neighbors that send valid Interests for an NDO, the PIT storage size for NDN is $SS_{NDN} = O((INT + |id|I)|PIT^i|_{NDN})$, where $|PIT^i|_{NDN}$ is the number of pending Interests in $PIT^i$ when NDN is used. Hence, even if $|PIT^i|_{NDN} = |PIT^i|_{SIFAH}$, the amount of additional PIT storage needed in NDN over SIFAH is $(|id|I)|PIT^i|_{NDN} - (|mh|)|PIT^i|_{NDN}$.

A maximum hop count of 255 for an Interest is more than enough, while the size of a nonce in NDN is 16 bytes. Hence, the additional PIT storage required in NDN compared to SIFAH is $(128I-8)|PIT^i|_{NDN}$. This is many orders of magnitude greater than the number of PIT entries and represents hundreds of gigabytes of RAM. Furthermore, because the NDN forwarding strategy does not detect loops when Interests are aggregated, many Interest entries in PITs may have to be stored until their lifetimes expire. Accordingly, $|PIT^i|_{NDN}$ can be much larger than $|PIT^i|_{SIFAH}$.

The additional FIB storage overhead in SIFAH compared to the NDN forwarding strategy consists of storing the hop count information for each name prefix $n(j)^*$ from each neighbor. This amounts to $(|mh|)(|FIB^i|)D^i$ at router i, where $D^i$ is the number of neighbors of router i and $|FIB^i|$ is the number of entries in $FIB^i$. Given that $D^i$ and I are of the same order and $O(|FIB^i|) < O(|PIT^i|)$, the additional FIB storage in SIFAH is far smaller than the additional PIT storage needed by the NDN forwarding strategy.

Computer and Communication System

Figure 14:
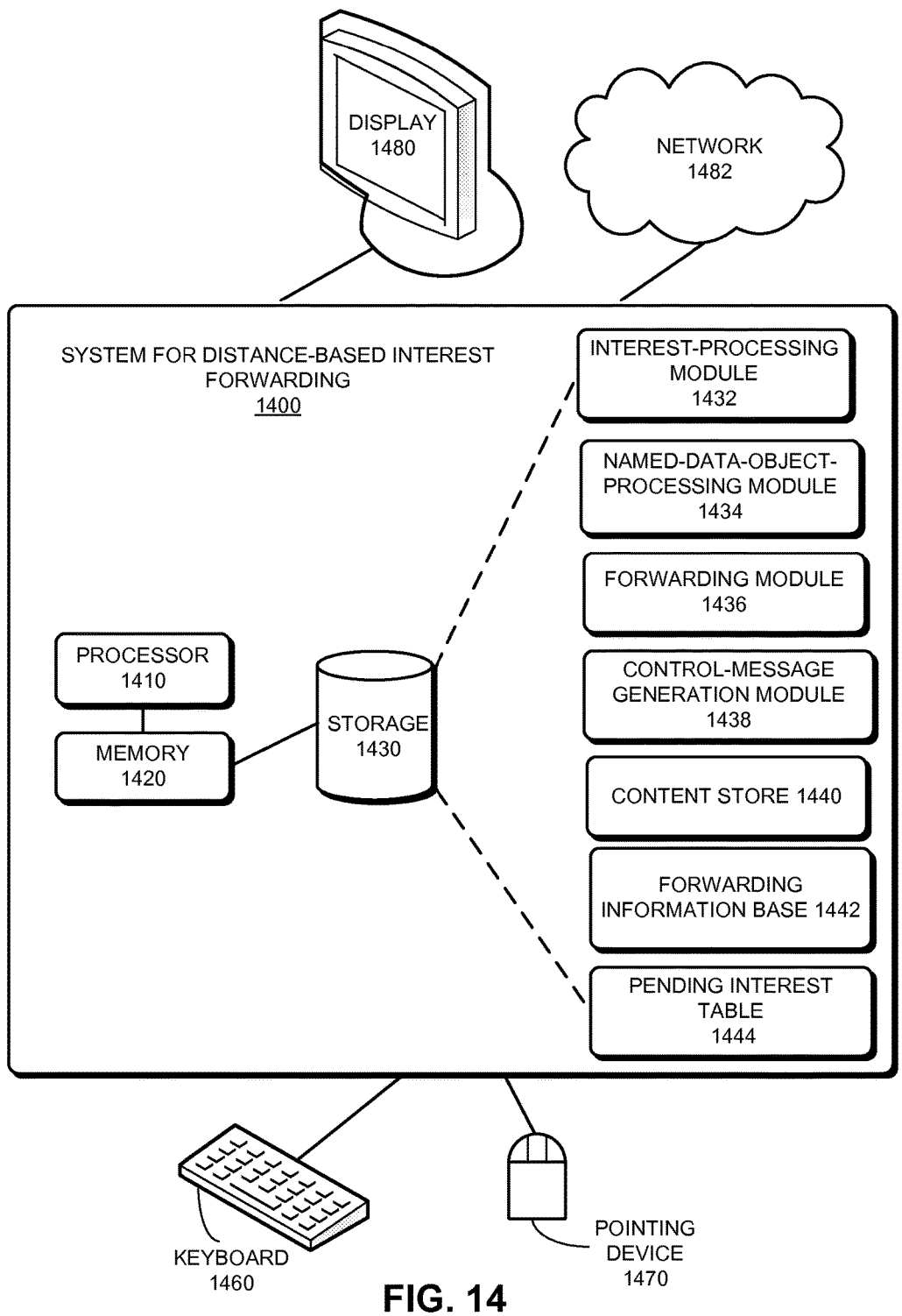
FIG. 14 illustrates an exemplary system for distance-based Interest forwarding, in accordance with an embodiment.

FIG. 14 illustrates an exemplary system for distance-based Interest forwarding, in accordance with an embodiment. A system 1400 for distance-based Interest forwarding comprises a processor 1410, a memory 1420, and a storage 1430. Storage 1430 typically stores instructions that can be loaded into memory 1420 and executed by processor 1410 to perform the methods mentioned above. In one embodiment, the instructions in storage 1430 can implement an Interest-processing module 1432, a named-data-object-processing module 1434, a forwarding module 1436, and a control-message generation module 1438, all of which can be in communication with each other through various means. Storage 1430 can further comprise a number of data structures, such as a Content Store 1440, a Forwarding Information Base 1442, and a Pending Interest Table 1444.

In some embodiments, modules 1432, 1434, 1436, and 1438 can be partially or entirely implemented in hardware and can be part of processor 1410. Further, in some embodiments, the system may not include a separate processor and memory. Instead, in addition to performing their specific tasks, modules 1432, 1434, 1436, and 1438, either separately or in concert, may be part of general- or special-purpose computation engines.

Storage 1430 stores programs to be executed by processor 1410. Specifically, storage 1430 stores a program that implements a system (application) for distance-based Interest forwarding. During operation, the application program can be loaded from storage 1430 into memory 1420 and executed by processor 1410. As a result, system 1400 can perform the functions described above. System 1400 can be coupled to an optional display 1480 (which can be a touch-screen display), keyboard 1460, and pointing device 1470, and can also be coupled via one or more network interfaces to network 1482.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The above description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

What is claimed is:

1. A computer-executable method for processing an interest in a content-centric network (CCN), the method comprising:
   receiving, by a first node in the CCN, an interest for requested content from a second node, wherein the interest includes at least (i) a name prefix that indicates a name of the content requested, and (ii) a hop count from the second node to a destination node that advertises the name of the content;
   determining, based on forwarding information and information associated with pending interests stored on the first node, whether a distance-based forwarding condition is met, wherein the forwarding information includes:
  one or more entries associated with the name of the content, a respective entry specifies a next hop neighbor through which the first node can forward the interest to the destination node that advertises the name of the content, the entry further specifies a hop count from the first node to the destination node via the next hop neighbor,
wherein the information associated with pending interests includes:
  one or more entries associated with the name of the content, a respective entry of the information associated with the pending interests corresponds to a pending interest, the entry further specifies the name of the content, a hop count indicated by the pending interest, and a set of incoming neighbors from which interests for the content are received, and
the distance-based forwarding condition is satisfied if a hop count specified by at least one of the entries included in the forwarding information and/or information associated with pending interests is less than the hop count included with the received interest;
in response to the distance-based forwarding condition being met, accepting the received interest at the first node and aggregating the received interest by adding the second node to the set of incoming neighbors; and
in response to the distance-based forwarding condition not being met, dropping the interest and sending a control message back to the second node.

2. The method of claim further comprising:
in response to the distance-based forwarding condition being met, forwarding the interest to a next hop neighbor that is highest ranked among neighbors that satisfy the distance-based forwarding condition.

3. The method of claim 1, further comprising:
comparing the name prefix included with the received interest to names included in a content store of one or more content objects stored on the first node.

4. The method of claim 3,
further compromising:
  in response to matching the name prefix included with the received interest to a name of a content object associated with the content store, forwarding the content object to the second node.

5. The method of claim 1, wherein the distance-based forwarding condition is satisfied if the hop count indicated by the pending interest is less than the hop count indicated by the received interest.

6. The method of claim 1, further comprising:
comparing the name prefix included with the received interest to names included in the forwarding information and the information associated with pending interests stored on the first node; and
applying the distance-based forwarding condition when the name prefix matches at least one of the names included in the forwarding information and the information associated with pending interests stored on the first node.

7. A non-transitory, computer-readable storage medium storing instructions that, when executed by a computing device, cause the computing device to perform a method for processing an interest in a content-centric network (CCN), the method comprising:
receiving, by a first node in the CCN, an interest for requested content from a second node, wherein the interest includes at least (i) a name prefix that indicates a name of the content requested, and (ii) a hop count from the second node to a destination node that advertises the name of the content;
determining, based on forwarding information and information associated with pending interests stored on the first node, whether a distance-based forwarding condition is met, wherein the forwarding information includes:
  one or more entries associated with the name of the content, a respective entry specifies a next hop neighbor through which the first node can forward the interest to the destination node that advertises the name of the content, the entry further specifies a hop count from the first node to the destination node via the next hop neighbor,
wherein the information associated with pending interests includes:
  one or more entries associated with the name of the content, a respective entry of the information associated with the pending interests corresponds to a pending interest, the entry further specifies the name of the content, a hop count indicated by the pending interest, and a set of incoming neighbors from which interests for the content are received, and
the distance-based forwarding condition is satisfied if a hop count specified by at least one of the entries included in the forwarding information and/or information associated with pending interests is less than the hop count included with the received interest;
in response to the distance-based forwarding condition being met, accepting the received interest at the first node and aggregating the received interest by adding the second node to the set of incoming neighbors; and
in response to the distance-based forwarding condition not being met, dropping the interest and sending a control message back to the second node.

8. The computer-readable storage medium of claim 7, wherein the method further comprises:
in response to the distance-based forwarding condition being met, forwarding the interest to a next hop neighbor that is highest ranked among neighbors that satisfy the distance-based forwarding condition.

9. The computer-readable storage medium of claim 7, wherein the method further comprises:
comparing the name prefix included with the received interest to names included in a content store of one or more content objects stored on the first node.

10. The computer-readable storage medium of claim 9, wherein the method further comprises:
in response to matching the name prefix included with the received interest to a name of a content object associated with the content store, forwarding the content object to the second node.

11. The computer-readable storage medium of claim 7, wherein the distance-based forwarding condition is satisfied if the hop count indicated by the pending interest is less than the hop count indicated by the received interest.

12. The computer-readable storage medium of claim 7, wherein the method further comprises:
comparing the name prefix included with the received interest to names included in the forwarding information and the information associated with pending interests stored on the first node; and
applying the distance-based forwarding condition when the name prefix matches at least one of the names included in the forwarding information and the information associated with pending interests stored on the first node.

13. A computer system for processing an interest in a content-centric network (CCN), the system comprising:
an interest-receiving module configured to receive, by a first node in the CCN, an interest for requested content from a second node, wherein the interest includes at least (i) a name prefix that indicates a name of the content requested, and (ii) a hop count from the second node to a destination node that advertises the name of the content;
an interest-processing module configured to:
process the received interest to determine, based on forwarding information and information associated with pending interests stored on the first node, whether a distance-based forwarding condition is met, wherein the forwarding information includes:
one or more entries associated with the name of the content, a respective entry specifies a next hop neighbor through which the first node can forward the interest to the destination node that advertises the name of the content, the entry further specifies a hop count from the first node to the destination node via the next hop neighbor,
wherein the information associated with pending interests includes:
one or more entries associated with the name of the content, a respective entry of the information associated with the pending interests corresponds to a pending interest, the entry further specifies the name of the content, a hop count indicated by the pending interest, and a set of incoming neighbors from which interests for the content are received, and
the distance-based forwarding condition is satisfied if a hop count specified by at least one of the entries included in the forwarding information and/or information associated with pending interests is less than the hop count included with the received interest;
in response to the distance-based forwarding condition being met, accepting the received interest at the first node and aggregating the received interest by adding the second node to the set of incoming neighbors; and
a control-message generation module configured to generate a control message in response to the distance-based forwarding condition not being met, and
wherein, in response to the distance-based forwarding condition not being met, the interest-processing module drops the interest and sends the control message back to the second node.

14. The system of claim 13, further comprising:
an interest-forwarding module configured to, in response to the distance-based forwarding condition being met, forward the interest to a next hop neighbor that is highest ranked among neighbors that satisfy the distance-based forwarding condition.

15. The system of claim 13, wherein the interest processing module is further configured to:
compare the name prefix included with the received interest to names included in a content store of one or more content objects stored on the first node.

16. The system of claim 15, further comprising:
a forwarding module configured to, in response to matching the name prefix included with the received interest to a name of a content object associated with the content store, forward the content object to the second node.

17. The system of claim 13, wherein the distance-based forwarding condition is satisfied if the hop count indicated by the pending interest is less than the hop count indicated by the received interest.

18. The system of claim 13, wherein the interest processing module is further configured to:
compare the name prefix included with the received interest to names included in the forwarding information and the information associated with pending interests stored on the first node; and
apply the distance-based forwarding condition when the name prefix matches at least one of the names included in the forwarding information and the information associated with pending interests stored on the first node.

* * * * *

UNITED STATES PATENT AND TRADEMARK OFFICE
CERTIFICATE OF CORRECTION

PATENT NO. : 10,237,189 B2
APPLICATION NO. : 14/572608
DATED : March 19, 2019
INVENTOR(S) : Jose J. Garcia-Luna-Aceves Page 1 of 1

It is certified that error appears in the above-identified patent and that said Letters Patent is hereby corrected as shown below:

In the Claims

Claim 2, Column 17, Line 32, please replace "The method of claim further" with --The method of claim 1, further--

Signed and Sealed this
Thirtieth Day of April, 2019

Andrei Iancu
*Director of the United States Patent and Trademark Office*